(12) United States Patent
Tian et al.

(10) Patent No.: US 10,583,506 B2
(45) Date of Patent: Mar. 10, 2020

(54) ABRASIVE ARTICLE AND METHOD OF FORMING

(71) Applicants: SAINT-GOBAIN ABRASIVES, INC., Worcester, MA (US); SAINT-GOBAIN ABRASIFS, Conflans-Sainte-Honorine (FR)

(72) Inventors: Yinggang Tian, Shrewsbury, MA (US); John J. Pearlman, Berlin, MA (US); Maureen A. Brosnan, West Boylston, MA (US); Arup K. Khaund, Northborough, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 16/158,457

(22) Filed: Oct. 12, 2018

(65) Prior Publication Data
US 2019/0084062 A1    Mar. 21, 2019

Related U.S. Application Data

(63) Continuation of application No. 15/840,003, filed on Dec. 13, 2017, now Pat. No. 10,137,514, which is a (Continued)

(51) Int. Cl.
| | | |
|---|---|---|
| *B23D 61/18* | (2006.01) | |
| *B24D 18/00* | (2006.01) | |
| *B28D 5/04* | (2006.01) | |

(52) U.S. Cl.
CPC ....... *B23D 61/185* (2013.01); *B24D 18/0018* (2013.01); *B24D 18/0072* (2013.01); *B28D 5/045* (2013.01)

(58) Field of Classification Search
CPC .............. B23D 61/185; B24D 18/0018; B24D 18/0072; B28D 5/045
See application file for complete search history.

(56) References Cited

U.S. PATENT DOCUMENTS

| 2,764,543 A | 9/1956 | Comstock, III et al. |
| 2,784,536 A | 3/1957 | Barron |
| (Continued) | | |

FOREIGN PATENT DOCUMENTS

| CH | 599837 A5 | 5/1978 |
| CN | 1275940 A | 12/2000 |
| (Continued) | | |

OTHER PUBLICATIONS

Machine translation of JP 2007152485 to Hiroaki et al. published Jun. 21, 2007 (The original Japanese document has been submitted in the IDS filed Oct. 19, 2018).*

(Continued)

*Primary Examiner* — Pegah Parvini
(74) *Attorney, Agent, or Firm* — Abel Schillinger, LLP; Joseph P. Sullivan

(57) ABSTRACT

An abrasive article includes a substrate having an elongated body, a plurality of discrete tacking regions defining a discontinuous distribution of features overlying the substrate, where at least one discrete tacking region of the plurality of discrete tacking regions includes a metal material having a melting temperature not greater than 450° C., a plurality of discrete formations overlying the substrate and spaced apart from the plurality of discrete tacking regions, and a bonding layer overlying the substrate, plurality of discrete tacking regions, and plurality of discrete formations.

19 Claims, 9 Drawing Sheets

Related U.S. Application Data continuation of application No. 15/195,236, filed on Jun. 28, 2016, now Pat. No. 9,878,382.

(60) Provisional application No. 62/186,225, filed on Jun. 29, 2015.

(56) References Cited

U.S. PATENT DOCUMENTS

| | | |
|---|---|---|
| 2,793,478 A | 5/1957 | Rohowetz |
| 3,150,470 A | 9/1964 | Barron |
| 3,178,273 A | 4/1965 | Libal |
| 3,854,898 A | 12/1974 | Whitney, Jr. et al. |
| 3,884,212 A | 5/1975 | Armstrong et al. |
| 3,894,673 A | 7/1975 | Lowder et al. |
| 3,906,684 A | 9/1975 | Marshall et al. |
| 3,984,214 A | 10/1976 | Pratt et al. |
| 3,997,302 A | 12/1976 | Supkis |
| 3,997,902 A | 12/1976 | Nard |
| 4,015,931 A | 4/1977 | Thankur |
| 4,018,576 A | 4/1977 | Lowder et al. |
| 4,031,851 A | 6/1977 | Camahort |
| 4,055,700 A | 10/1977 | Ronnquist et al. |
| 4,187,828 A | 2/1980 | Schmid |
| 4,384,564 A | 5/1983 | Smith et al. |
| 4,399,167 A | 8/1983 | Pipkin |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,811,170 A | 3/1989 | Pammer |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A | 10/1995 | Cosmano et al. |
| 5,492,771 A | 2/1996 | Lowder et al. |
| 5,496,386 A | 3/1996 | Broberg et al. |
| 5,511,718 A | 4/1996 | Lowder et al. |
| 5,544,643 A | 8/1996 | Bauer et al. |
| 5,560,753 A | 10/1996 | Schnabel et al. |
| 5,571,296 A | 11/1996 | Barber, Jr. et al. |
| 5,578,098 A | 11/1996 | Gagliardi et al. |
| 5,595,578 A | 1/1997 | Stubbs et al. |
| 5,616,065 A | 4/1997 | Egglhuber |
| 5,643,055 A | 7/1997 | Linzell |
| 5,660,320 A | 8/1997 | Hoffmuller et al. |
| 5,681,361 A | 10/1997 | Sanders, Jr. |
| 5,707,509 A | 1/1998 | Hartweg |
| 5,840,089 A | 11/1998 | Chesley et al. |
| 5,846,269 A | 12/1998 | Shiue et al. |
| 5,855,314 A | 1/1999 | Shiue et al. |
| 5,913,305 A | 6/1999 | Hauser |
| 5,924,917 A | 7/1999 | Benedict |
| 5,935,407 A | 8/1999 | Nenov et al. |
| 5,964,210 A | 10/1999 | Hodsden |
| 5,975,988 A | 11/1999 | Christianson |
| 6,006,738 A | 12/1999 | Itoh et al. |
| 6,056,794 A | 5/2000 | Stoetzel et al. |
| 6,065,462 A | 5/2000 | Hodsden et al. |
| 6,070,570 A | 6/2000 | Ueoka et al. |
| 6,102,024 A | 8/2000 | Buljan et al. |
| 6,194,068 B1 | 2/2001 | Ohashi et al. |
| 6,194,086 B1 | 2/2001 | Nenov et al. |
| 6,228,133 B1 | 5/2001 | Thurber et al. |
| 6,279,564 B1 | 8/2001 | Hodseden |
| 6,286,498 B1 | 9/2001 | Sung |
| 6,311,684 B1 | 11/2001 | Hodsden et al. |
| 6,319,108 B1 * | 11/2001 | Adefris ............ B24B 7/20 451/526 |
| 6,368,198 B1 | 4/2002 | Sung et al. |
| 6,463,921 B2 | 10/2002 | Shimazaki et al. |
| 6,478,831 B2 | 11/2002 | Tselesin |
| 6,613,113 B2 | 9/2003 | Minick et al. |
| 6,679,243 B2 | 1/2004 | Sung |
| 6,755,720 B1 | 6/2004 | Ishizaki et al. |
| 6,783,442 B2 | 8/2004 | Lukschandel et al. |
| 6,790,126 B2 | 9/2004 | Wood et al. |
| 6,797,023 B2 | 9/2004 | Knapp et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 | 10/2006 | Sung |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 | 10/2008 | Chen et al. |
| 7,556,558 B2 | 7/2009 | Palmgren |
| 7,704,127 B2 | 4/2010 | Taniguchi et al. |
| 7,926,478 B2 | 4/2011 | Nakai et al. |
| 8,037,878 B2 | 10/2011 | Kitagawa et al. |
| 8,206,472 B2 | 6/2012 | Tani et al. |
| 8,257,572 B2 | 9/2012 | Castro et al. |
| 8,291,895 B2 | 10/2012 | Sudarshan et al. |
| 8,425,640 B2 | 4/2013 | Liebelt et al. |
| 8,657,652 B2 | 2/2014 | Hwang et al. |
| 8,677,986 B2 | 3/2014 | Kazahaya et al. |
| 8,707,944 B2 | 4/2014 | Morita et al. |
| 8,720,429 B2 | 5/2014 | Lange et al. |
| 8,802,602 B2 | 8/2014 | Schmitjes et al. |
| 8,820,308 B2 | 9/2014 | Sudarshan et al. |
| 9,067,268 B2 | 6/2015 | Liebelt et al. |
| 9,254,552 B2 | 2/2016 | Tian et al. |
| 9,375,826 B2 | 6/2016 | Tian et al. |
| 9,533,397 B2 | 1/2017 | Rehrig et al. |
| 9,687,962 B2 | 6/2017 | Tian et al. |
| 2001/0025457 A1 | 10/2001 | Tselesin |
| 2002/0010068 A1 | 1/2002 | Komatsu |
| 2002/0077054 A1 | 6/2002 | Sung |
| 2002/0100469 A1 | 8/2002 | Shimazaki et al. |
| 2003/0084894 A1 | 5/2003 | Sung |
| 2003/0089362 A1 | 5/2003 | Yamada et al. |
| 2003/0121212 A1 | 7/2003 | Minick et al. |
| 2003/0134577 A1 | 7/2003 | Coad |
| 2003/0140914 A1 | 7/2003 | Minick et al. |
| 2004/0107648 A1 | 6/2004 | Sung |
| 2004/0112359 A1 | 6/2004 | Sung |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0083688 A1 | 4/2006 | Singaram et al. |
| 2006/0135050 A1 * | 6/2006 | Petersen ............ B24D 11/005 451/523 |
| 2006/0194038 A1 | 8/2006 | You et al. |
| 2006/0258268 A1 | 11/2006 | Miyata et al. |
| 2007/0023027 A1 | 2/2007 | Nakai et al. |
| 2007/0051354 A1 | 3/2007 | Sung |
| 2007/0051355 A1 | 3/2007 | Sung |
| 2007/0151388 A1 | 7/2007 | Yazawa et al. |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141994 A1 | 6/2008 | Skovhaard-Soerensen et al. |

(56) References Cited

U.S. PATENT DOCUMENTS

| | | |
|---|---|---|
| 2008/0148650 A1 | 6/2008 | You |
| 2008/0206576 A1 | 8/2008 | Qian et al. |
| 2008/0212733 A1 | 9/2008 | Pop et al. |
| 2008/0261499 A1 | 10/2008 | Tani et al. |
| 2008/0271783 A1 | 11/2008 | Murakami et al. |
| 2009/0064983 A1 | 3/2009 | Sudarshan et al. |
| 2009/0098365 A1 | 4/2009 | Moeltgen |
| 2009/0120422 A1 | 5/2009 | Taniguchi |
| 2009/0202781 A1 | 8/2009 | Hall et al. |
| 2009/0242410 A1 | 10/2009 | Castro et al. |
| 2009/0283089 A1 | 11/2009 | Sung |
| 2010/0197202 A1 | 8/2010 | Branagan et al. |
| 2011/0009039 A1 | 1/2011 | Balagani et al. |
| 2011/0039070 A1 | 2/2011 | Liebelt et al. |
| 2011/0045292 A1 | 2/2011 | Tian et al. |
| 2011/0263187 A1 | 10/2011 | Liu et al. |
| 2011/0308371 A1 | 12/2011 | Morita et al. |
| 2012/0037140 A1 | 2/2012 | Campos et al. |
| 2012/0055097 A1 | 3/2012 | Tian et al. |
| 2012/0167482 A1 | 7/2012 | Tian et al. |
| 2012/0216787 A1 | 8/2012 | Morita et al. |
| 2012/0295119 A1 | 11/2012 | David |
| 2013/0000211 A1 | 1/2013 | Upadhyay et al. |
| 2013/0032129 A1 | 2/2013 | Yasuhiko et al. |
| 2013/0061535 A1 | 3/2013 | Tian et al. |
| 2013/0084786 A1 | 4/2013 | Rehrig et al. |
| 2013/0092143 A1 | 4/2013 | Sudarshan et al. |
| 2013/0205676 A1 | 8/2013 | Tian et al. |
| 2013/0219801 A1 | 8/2013 | Liebelt et al. |
| 2014/0007513 A1 | 1/2014 | Rehrig et al. |
| 2014/0011434 A1 | 1/2014 | Puzemis et al. |
| 2014/0013675 A1 | 1/2014 | Tian et al. |
| 2014/0017984 A1 | 1/2014 | Rehrig et al. |
| 2014/0017985 A1* | 1/2014 | Tian ............... B23D 61/185 451/533 |
| 2014/0150766 A1* | 6/2014 | Che ............... B24B 27/0633 125/16.02 |
| 2014/0311472 A1 | 10/2014 | Tian et al. |
| 2016/0144481 A1 | 5/2016 | Tian et al. |
| 2016/0375514 A1 | 12/2016 | Tian et al. |
| 2017/0066069 A1 | 3/2017 | Rehrig et al. |
| 2017/0252897 A1 | 9/2017 | Tian et al. |

FOREIGN PATENT DOCUMENTS

| | | |
|---|---|---|
| CN | 1456410 A | 11/2003 |
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |
| CN | 101132884 A | 2/2008 |
| CN | 201283606 Y | 8/2009 |
| CN | 101564828 A | 10/2009 |
| CN | 101712135 A | 5/2010 |
| CN | 102896373 A | 1/2013 |
| DE | 10-2004-043718 A1 | 3/2006 |
| EP | 0237784 B1 | 6/1991 |
| EP | 1371438 A1 | 12/2003 |
| EP | 1475463 B1 | 11/2004 |
| EP | 1685934 A1 | 8/2006 |
| GB | 876605 A | 9/1961 |
| GB | 962357 A | 7/1964 |
| GB | 1254365 A | 11/1971 |
| GB | 1342359 A | 1/1974 |
| JP | 61-071949 A | 4/1986 |
| JP | 63-102868 A | 5/1988 |
| JP | 3079264 A | 4/1991 |
| JP | H06262533 A | 9/1994 |
| JP | H07-096454 A | 4/1995 |
| JP | H08-126953 A | 5/1996 |
| JP | H09-150314 A | 6/1997 |
| JP | H09-155631 A | 6/1997 |
| JP | H09-254006 | 9/1997 |
| JP | H10-034544 A | 2/1998 |
| JP | H10-118938 A | 5/1998 |
| JP | H10-256581 A | 9/1998 |
| JP | H10-328932 A | 12/1998 |
| JP | H11-216657 A | 8/1999 |
| JP | H11-216658 A | 8/1999 |
| JP | 29-57571 B1 | 10/1999 |
| JP | H11-277398 A | 10/1999 |
| JP | H11-320379 A | 11/1999 |
| JP | H11-347911 A | 12/1999 |
| JP | 2000-052226 A | 2/2000 |
| JP | 2000-071160 A | 3/2000 |
| JP | 2000-071162 A | 3/2000 |
| JP | 2000-094297 A | 4/2000 |
| JP | 2000-158318 A | 6/2000 |
| JP | 2000-158319 A | 6/2000 |
| JP | 2000-218504 A | 8/2000 |
| JP | 2000-246542 A | 9/2000 |
| JP | 2000-246654 A | 9/2000 |
| JP | 2000-263452 A | 9/2000 |
| JP | 2000-271872 A | 10/2000 |
| JP | 2000-288902 A | 10/2000 |
| JP | 3104553 B2 | 10/2000 |
| JP | 2001-054850 A | 2/2001 |
| JP | 2001-105295 A | 4/2001 |
| JP | 2001-113519 A | 4/2001 |
| JP | 2001-259993 A | 9/2001 |
| JP | 2001-277092 A | 10/2001 |
| JP | 2001-287146 A | 10/2001 |
| JP | 2001-341076 A1 | 12/2001 |
| JP | 2002-172564 A | 6/2002 |
| JP | 2002-205272 A | 7/2002 |
| JP | 2002-254286 A | 9/2002 |
| JP | 2002-254327 A | 9/2002 |
| JP | 2002-273663 A | 9/2002 |
| JP | 2002-326151 A | 11/2002 |
| JP | 2002-331466 A | 11/2002 |
| JP | 2002-361566 A | 12/2002 |
| JP | 2003-231063 A | 8/2003 |
| JP | 2003-525130 A | 8/2003 |
| JP | 2003-275970 A | 9/2003 |
| JP | 2003-291057 A | 10/2003 |
| JP | 2004-009239 A | 1/2004 |
| JP | 2004-050301 A | 2/2004 |
| JP | 2004-050318 A | 2/2004 |
| JP | 2004-174680 A | 6/2004 |
| JP | 3103807 U | 6/2004 |
| JP | 2004-209573 A | 7/2004 |
| JP | 2004-216553 A | 8/2004 |
| JP | 2004-261889 A | 9/2004 |
| JP | 2004-338023 A | 12/2004 |
| JP | 2005-007221 A | 1/2005 |
| JP | 2002-036091 A | 2/2005 |
| JP | 2005-238377 A | 9/2005 |
| JP | 2006-007387 A | 1/2006 |
| JP | 2006-123024 A | 5/2006 |
| JP | 2006-123055 A | 5/2006 |
| JP | 2006-130636 A | 5/2006 |
| JP | 3777285 B2 | 5/2006 |
| JP | 2006-150505 A | 6/2006 |
| JP | 2006-179677 A | 7/2006 |
| JP | 2006-181701 A | 7/2006 |
| JP | 2006-231479 A | 9/2006 |
| JP | 2006-272499 A | 10/2006 |
| JP | 2007-021677 A | 2/2007 |
| JP | 2007-044870 A | 2/2007 |
| JP | 2007-061976 A | 3/2007 |
| JP | 2007-152485 A | 6/2007 |
| JP | 2007-152486 A | 6/2007 |
| JP | 2007-196312 A | 8/2007 |
| JP | 2007-196329 A | 8/2007 |
| JP | 2007-203393 A | 8/2007 |
| JP | 2007-203417 A | 8/2007 |
| JP | 2007-237628 A | 9/2007 |
| JP | 2007-253268 A | 10/2007 |
| JP | 2007-268627 A | 10/2007 |
| JP | 2007-281176 A | 10/2007 |
| JP | 2007-307261 A | 11/2007 |
| JP | 2008-068332 A | 3/2008 |

(56) References Cited

FOREIGN PATENT DOCUMENTS

| | | |
|---|---|---|
| JP | 2008-221406 A | 9/2008 |
| JP | 2009-066689 A | 4/2009 |
| JP | 2009285791 A | 12/2009 |
| JP | 2010-000583 A | 1/2010 |
| JP | 2010-000584 A | 1/2010 |
| JP | 2010-131698 A | 6/2010 |
| JP | 2010-201602 A | 9/2010 |
| JP | 2010-284754 A | 12/2010 |
| JP | 2011-016208 A | 1/2011 |
| JP | 2011-137213 A | 7/2011 |
| JP | 2011-161613 A | 8/2011 |
| JP | 2014-058014 A | 4/2014 |
| KR | 2000-0033534 A | 6/2000 |
| KR | 2001-0055980 A | 7/2001 |
| KR | 10-2006-0006856 A | 1/2006 |
| RU | 2078680 C1 | 5/1997 |
| RU | 83210 U1 | 5/2009 |
| RU | 91924 U1 | 3/2010 |
| TW | 442370 B | 6/2001 |
| TW | I291389 B | 12/2007 |
| TW | 201111106 A | 4/2011 |
| WO | 98/05466 A1 | 2/1998 |
| WO | 9821004 A1 | 5/1998 |
| WO | 98/35784 A1 | 8/1998 |
| WO | 99/46077 A2 | 9/1999 |
| WO | 00/61324 A2 | 10/2000 |
| WO | 01/43918 A2 | 6/2001 |
| WO | 2004/069479 A1 | 8/2004 |
| WO | 2005/064677 A1 | 7/2005 |
| WO | 2006/070534 A1 | 7/2006 |
| WO | 2006/083688 A1 | 8/2006 |
| WO | 2008/000072 A1 | 1/2008 |
| WO | 2009/064345 A2 | 5/2009 |
| WO | 2009/158507 A2 | 12/2009 |
| WO | 2010/071198 A1 | 6/2010 |
| WO | 2010/125083 A1 | 11/2010 |
| WO | 2010/125085 A1 | 11/2010 |
| WO | 2011/020105 A2 | 2/2011 |
| WO | 2011/020109 A2 | 2/2011 |
| WO | 2011138192 A2 | 11/2011 |
| WO | 2012/092614 A2 | 7/2012 |
| WO | 2013/040423 A2 | 3/2013 |
| WO | 2013/049204 A2 | 4/2013 |
| WO | 2013/147892 A1 | 10/2013 |
| WO | 2014/004982 A1 | 1/2014 |
| WO | 2014/004991 A1 | 1/2014 |
| WO | 2014/005009 A1 | 1/2014 |
| WO | 2014/005015 A1 | 1/2014 |
| WO | 2014/005028 A1 | 1/2014 |
| WO | 2014/005037 A1 | 1/2014 |
| WO | 2014/172611 A1 | 10/2014 |
| WO | 2017004037 A1 | 1/2017 |

OTHER PUBLICATIONS

Enomoto, Toshiyuki et al "Development of a Resinoid Diamond Wire Containing Metal Power for Slicing a Slicing Ingot." Annals of the CIRP. 32.1 (1983): 273-276.

Jun Sugawara et al., "Development of fixed abrasive-grain wire saw with less cutting loss" SEI Technical Review No. 58, Jun. 2004, pp. 7-11.

Daisuke Ide, "Resin Bond Diamond wire for slicing ceramics", Industrial Diamond Review vol. 2/2007, pp. 32-34.

Y. Chiba et al., "Development of a high-speed manufacturing method for electroplated diamond wire tools", Annals of the CIRP vol. 52/1/2003, pp. 281-284.

Osamu Kamiya et al., "Diamond and metal bonding by active solder for micro-cutting wire", Int. J. of Mdern Physics B, vol. 20, Nos. 25-27 (2006) pp. 3932-3937.

Fujisawa, M. et al. "Precision Sawing with Wire Saw." Annals of the CIRP. 32.1 (1983): 87-90.

Conversion US mesh (tamis)—microns: http://www.granuloshop.com/Conversion.htm (Sep. 2, 2003).

International Search Report for PCT/US2010/045643 dated Apr. 29, 2011.

International Search Report for PCT/US2013/048491 dated Aug. 26, 2013.

Handbook of Thermoset Plastics, 2nd edition, p. 28, 1998.

International Search Report for PCT/US2010/045647 dated Apr. 29, 2011.

International Search Report for PCT/US2012/031699 dated Nov. 16, 2012.

International Search Report for PCT/US2011/068240 dated Aug. 27, 2012.

International Search Report for PCT/US2012/055529 dated Feb. 21, 2013.

International Search Report for PCT/US2012/057334 dated Mar. 28, 2013.

Higashi, Taisuke et al., Development of Low Melting Temperature Coating Materials for High Performance Diamonds Wire Saw: Effect of an Additive on Mechanical Properties.

Nakamura Choko Co., Ltd., "Company Report", Mar. 31, 2010, 10 pages.

International Search Report for PCT/US2013/048609 dated Sep. 2, 2013.

International Search Report for PCT/US2013/048511 dated Aug. 27, 2013.

International Search Report for PCT/US2013/048549 dated Sep. 11, 2013.

International Search Report for PCT/US2013/048565 dated Aug. 27, 2013.

International Search Report for PCT/US2013/048587 dated Sep. 17, 2013.

Patel, Mitesh M., "Characterizing Fatigue and Fracture Response of Medical Grade Nickel-Titanium Alloys by Rotary Beam Testing," Presented at the ASTM Symposium on Fatigue and Fracture of Medical Metallic Materials and Devices, Dallas, Texas, Nov. 2005, 12 pages.

International Search Report for PCT/US2014/034611 dated Aug. 28, 2014.

Copper and Copper Alloys Jan. 1, 2001 (exerpt)—Davis, ASM International; pp. 127-130.

International Search Report for International Application No. PCT/JP2010/069294 dated Nov. 22, 2010.

International Search Report and Written Opinion for PCT Application No. PCT/US2016/039810, dated Oct. 11, 2016, 16 pages.

* cited by examiner

ABRASIVE ARTICLE AND METHOD OF FORMING

CROSS-REFERENCE TO RELATED APPLICATION(S)

The present application is a continuation of and claims priority to U.S. patent application Ser. No. 15/840,003, filed Dec. 13, 2017, entitled "ABRASIVE ARTICLE AND METHOD OF FORMING," naming as inventors Yinggang Tian et al, which is a continuation of and claims priority to U.S. patent application Ser. No. 15/195,236, filed Jun. 28, 2016, entitled "ABRASIVE ARTICLE AND METHOD OF FORMING," naming as inventors Yinggang Tian et al., now U.S. Pat. No. 9,878,382, which claims priority under 35 U.S.C. § 119(e) to U.S. Provisional Patent Application No. 62/186,225, filed Jun. 29, 2015, entitled "ABRASIVE ARTICLE AND METHOD OF FORMING," naming as inventors Yinggang Tian et al., which applications are assigned to the current assignee hereof and are incorporated by reference herein in their entireties.

BACKGROUND

The following is directed to methods of forming abrasive articles, and particularly, single-layered abrasive articles.

DESCRIPTION OF THE RELATED ART

A variety of abrasive tools have been developed over the past century for various industries for the general function of removing material from a workpiece, including for example, sawing, drilling, polishing, cleaning, carving, and grinding. In particular reference to the electronics industry, abrasive tools suitable for slicing crystal ingots of material to form wafers is particularly pertinent. As the industry continues to mature, ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the tensile strength of the wire saw, and the wire saw becomes susceptible to breaking and premature failure during cutting applications under high tension. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to a first aspect, an abrasive article includes a substrate comprising an elongated body, a plurality of discrete tacking regions defining a discontinuous distribution of features overlying the substrate, wherein at least one discrete tacking region of the plurality of discrete tacking regions comprises a metal material having a melting temperature not greater than 450° C., a plurality of discrete formations overlying the substrate and spaced apart from the plurality of discrete tacking regions, and a bonding layer overlying the substrate, plurality of discrete tacking regions, and plurality of discrete formations.

In yet another aspect, an abrasive article includes a substrate including an elongated body, a plurality of discrete tacking regions comprising a metal material overlying the substrate, wherein each discrete tacking region is isolated from another discrete tacking region and at least one abrasive particle is associated with each discrete tacking region, and a bonding layer overlying the plurality of discrete tacking regions, the at least one abrasive particle and in direct contact with at least a portion of the substrate.

For another aspect, an abrasive article includes a substrate comprising an elongated body, a plurality of discrete tacking regions overlying the substrate and defining gap regions between each of the discrete tacking regions of the plurality of discrete tacking regions, abrasive particles overlying the plurality of discrete tacking regions, and a plurality of discrete formations overlying the substrate and spaced apart from the plurality of discrete tacking regions and the abrasive particles.

In another aspect, a method of forming an abrasive article includes translating a substrate having an elongated body through a mixture including abrasive particles and a particulate including a tacking material, attaching at least a portion of the abrasive particles and powder material to the substrate, and treating the substrate to form an abrasive article preform including a plurality of discrete tacking regions overlying the substrate and defining gap regions between each of the discrete tacking regions of the plurality of discrete tacking regions, abrasive particles overlying the plurality of discrete tacking regions, and a plurality of discrete formations overlying the substrate and spaced apart from the plurality of discrete tacking regions and the abrasive particles.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive articles, and particularly abrasive articles suitable for abrading and sawing through workpieces. In particular instances, the abrasive articles herein can form wire saws, which may be used in processing of sensitive, crystalline materials in the electronics industry, optics industry, and other associated industries.

Figure 1:
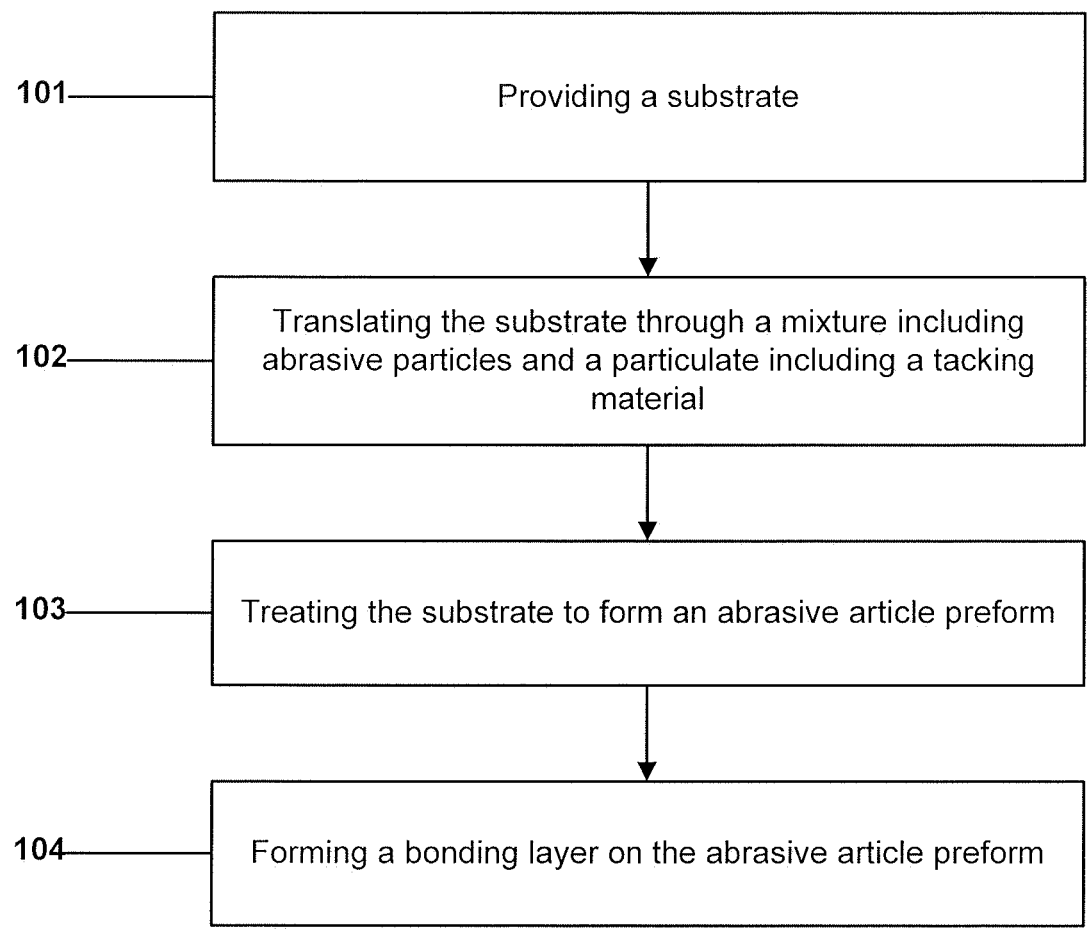
FIG. 1 includes a flow chart providing a process for forming an abrasive article in accordance with an embodiment.

FIG. 1 includes a flow chart providing a process of forming an abrasive article in accordance with an embodiment. The process can be initiated at step 101 by providing a substrate. The substrate can provide a surface for affixing abrasive materials thereto, thus facilitating the abrasive capabilities of the abrasive article.

In accordance with an embodiment, the process of providing a substrate can include a process of providing a substrate having an elongated body. In particular instances, the elongated body can have an aspect ratio of length:width of at least 10:1. In other embodiments, the elongated body can have an aspect ratio of at least about 100:1, such as at least 1000:1, or even at least about 10,000:1. The length of the substrate can be the longest dimension measured along a longitudinal axis of the substrate. The width can be a second longest (or in some cases smallest) dimension of the substrate measured perpendicular to the longitudinal axis.

Furthermore, the substrate can be in the form of elongated body having a length of at least about 50 meters. In fact, other substrates can be longer, having an average length of at least about 100 meters, such as at least about 500 meters, at least about 1,000 meters, or even at least about 10,000 meters.

Furthermore, the substrate can have a width that may not be greater than about 1 cm. In fact, the elongated body can have an average width of not greater than about 0.5 cm, such as not greater than about 1 mm, not greater than about 0.8 mm, or even not greater than about 0.5 mm. Still, the substrate may have an average width of at least about 0.01 mm, such as at least about 0.03 mm. It will be appreciated that the substrate can have an average width within a range between any of the minimum and maximum values noted above.

In certain embodiments, the elongated body can be a wire having a plurality of filaments braided together. That is, the substrate can be formed of many smaller wires wound around each other, braided together, or fixed to another object, such as a central core wire. Certain designs may utilize piano wire as a suitable structure for the substrate. For example, the substrate can be a high strength steel wire having a break strength of at least about 3 GPa. The substrate break strength can be measured by ASTM E-8 for tension testing of metallic materials with capstan grips. The wire may be coated with a layer of a particular material, such as a metal, including for example, brass. Still, in other instances, the wire may be essentially free of any coatings on the exterior surface.

The elongated body can have a certain shape. For example, the elongated body can have a generally cylindrical shape such that it has a circular cross-sectional contour. In using elongated bodies having a circular cross-sectional shape, as viewed in a plane extending transversely to the longitudinal axis of the elongated body.

The elongated body can be made of various materials, including for example, inorganic materials, organic materials (e.g., polymers and naturally occurring organic materials), and a combination thereof. Suitable inorganic materials can include ceramics, glasses, metals, metal alloys, cermets, and a combination thereof. In certain instances, the elongated body can be made of a metal or metal alloy material. For example, the elongated body may be made of a transition metal or transition metal alloy material and may incorporate elements of iron, nickel, cobalt, copper, chromium, molybdenum, vanadium, tantalum, tungsten, and a combination thereof.

Suitable organic materials can include polymers, which can include thermoplastics, thermosets, elastomers, and a combination thereof. Particularly useful polymers can include polyimides, polyamides, resins, polyurethanes, polyesters, and the like. It will further be appreciated that the elongated body can include natural organic materials, for example, rubber.

Furthermore, the abrasive articles herein can form a substrate having a certain resistance to fatigue. For example, the substrates can have an average fatigue life of at least 300,000 cycles as measured through a Rotary Beam Fatigue Test or a Hunter Fatigue Test. The test can be a MPIF Std. 56. The rotary beam fatigue test measures the number of cycles up to wire break at designated stress (e.g. 700 MPa), i.e. constant stress or the stress under which the wire was not ruptured in a cyclic fatigue test with a number of repeating cycles of up to $10^6$ (e.g. stress represents fatigue strength). In other embodiments, the substrate may demonstrate a higher fatigue life, such as least about 400,000 cycles, at least about 450,000 cycles, at least about 500,000 cycles, or even at least about 540,000 cycles. Still, the substrate may have a fatigue life that is not greater than about 2,000,000 cycles.

After providing a substrate at step 101, the process can continue at step 102, which includes translating the substrate through a mixture including abrasive particles and a particulate including a tacking material. To facilitate processing and formation of the abrasive article, the substrate may be connected to a spooling mechanism. For example, the wire can be translated between a feed spool and a receiving spool. The translation of the wire between the feed spool and the receiving spool can facilitate processing, such that for example, the wire may be translated through desired forming processes to form the component layers of the finally-formed abrasive article while being translated from the feed spool to the receiving spool.

In further reference to the process of providing a substrate, it will be appreciated that the substrate can be spooled from a feed spool to a receiving spool at a particular rate to facilitate processing. For example, the substrate can be spooled at a rate of not less than about 5 m/min from the feed spool to the receiving spool. In other embodiments, the rate of spooling can be greater, such that it is at least about 8 m/min, at least about 10 m/min, at least about 12 m/min, or even at least about 14 m/min. In particular instances, the spooling rate may be not greater than about 500 m/min, such as not greater than about 200 m/min. The rate of spooling can be within a range between any of the minimum and maximum values noted above. It will be appreciated the spooling rate can represent the rate at which the finally-formed abrasive article can be formed.

In certain instances, the substrate can include one or more optional barrier layers overlying the exterior surface of the substrate. According to one aspect, the barrier layer can be overlying the exterior surface of a substrate, such that it may be in direct contact with the exterior (i.e., peripheral) surface of the substrate, and more particularly, can be bonded directly to the exterior surface of the substrate. In one embodiment, the barrier layer can be bonded to the exterior surface of the substrate and may define a diffusion bond region between the barrier layer and the substrate, characterized by an interdiffusion of at least one metal element of the substrate and one element of the barrier layer. In one particular embodiment, the barrier layer can be disposed between the substrate and other overlying layers, including for example, a tacking layer, a bonding layer, a coating layer, a layer of one or more types of abrasive particles, or a combination thereof.

The process of providing a substrate having a barrier layer can include sourcing such a construction or fabricating such a substrate and barrier layer construction. The barrier layer can be formed through various techniques, including for example, a deposition process. Some suitable deposition processes can include, printing, spraying, dip coating, die coating, plating (e.g., electrolytic or electroless), and a combination thereof. In accordance with an embodiment, the process of forming the barrier layer can include a low temperature process. For example, the process of forming the barrier layer can be conducted at a temperature of not greater than about 400° C., such as not greater than about 375° C., not greater than about 350° C., not greater than about 300° C., or even not greater than about 250° C. Furthermore, after forming the barrier layer it will be appreciated that further processing can be undertaken including for example cleaning, drying, curing, solidifying, heat treating, and a combination thereof. The barrier layer can serve as a barrier to chemical impregnation of the core material by various chemical species (e.g., hydrogen) in subsequent plating processes. Moreover, the barrier layer may facilitate improved mechanical durability.

In one embodiment, the barrier layer can be a single layer of material. The barrier layer can be in the form of a continuous coating, overlying the entire peripheral surface of the substrate. The barrier material can include an inorganic material, such as a metal or metal alloy material. Some suitable materials for use in the barrier layer can include transition metal elements, including but not limited to tin, silver, copper, zinc, nickel, titanium, and a combination thereof. In another embodiment, the barrier layer may include brass. In one embodiment, the barrier layer can be a single layer of material consisting essentially of tin. In one particular instance, the barrier layer can contain a continuous layer of tin having a purity of at least 99.99% tin. Notably, the barrier layer can be a substantially pure, non-alloyed material. That is, the barrier layer can be a metal material (e.g., tin) made of a single metal material.

In other embodiments, the barrier layer can be a metal alloy. For example, the barrier layer can include a tin alloy, such as a composition including a combination of tin and another metal, including transition metal species such as copper, silver, and the like. Some suitable tin-based alloys can include tin-based alloys including silver, and particularly Sn96.5/Ag3.5, Sn96/Ag4, and Sn95/Ag5 alloys. Other suitable tin-based alloys can include copper, and particularly including Sn99.3/Cu0.7 and Sn97/Cu3 alloys. Additionally, certain tin-based alloys can include a percentage of copper and silver, including for example, Sn99/Cu0.7/Ag0.3, Sn97/Cu2.75/Ag0.25 and, Sn95.5/Ag4/Cu0.5 alloys. In still another embodiment, the barrier layer can include a metal alloy including a combination of copper and nickel, and more specifically may include a metal alloy consisting essentially of copper and nickel.

In another aspect, the barrier layer can be formed from a plurality of discrete layers, including for example, at least two discrete layers. For example, the barrier layer can include an inner layer and an outer layer overlying the inner layer. According to an embodiment, the inner layer and outer layer can be directly contacting each other, such that the outer layer is directly overlying the inner layer and joined at an interface. Accordingly, the inner layer and outer layer can be joined at an interface extending along the length of the substrate.

In one embodiment, the inner layer can include any of the characteristics of the barrier layer described above. For example, the inner layer can include a continuous layer of material including tin, copper, nickel, or a combination thereof. Moreover, the inner layer and outer layer can be formed of different materials relative to each other. That is, for example, at least one element present within one of the layers can be absent within the other layer. In one particular embodiment, the outer layer can include an element that is not present within the inner layer.

The outer layer can include any of the characteristics of the barrier layer described above. For example, the outer layer can be formed such that it includes an inorganic material, such as a metal or a metal alloy. More particularly, the outer layer can include a transition metal element. For example, in one certain embodiment, the outer layer can include nickel. In another embodiment, the outer layer can be formed such that it consists essentially of nickel.

In certain instances, the outer layer can be formed in the same manner as the inner layer, such as a deposition process. However, it is not necessary that the outer layer be formed in the same manner as the inner layer. In accordance with an embodiment, the outer layer can be formed through a deposition process including plating, spraying, printing, dipping, die coating, deposition, and a combination thereof. In certain instances, the outer layer of the barrier layer can be formed at relatively low temperatures, such as temperatures not greater than about 400° C., not greater than about 375° C., not greater than about 350° C., not greater than about 300° C., or even not greater than 250° C. According to one particular process, the outer layer can be formed though a non-plating process, such as die coating. Moreover, the processes used to form the outer layer may include other methods including for example heating, curing, drying, and a combination thereof. It will be appreciated that formation of the outer layer in such a manner may facilitate limiting the impregnation of unwanted species within the core and/or inner layer.

In accordance with an embodiment, the inner layer of the barrier layer can be formed to have a particular average thickness suitable for acting as a chemical barrier layer. For example, the barrier layer can have an average thickness of at least about 0.05 microns, such as least about 0.1 microns, at least about 0.2 microns, at least about 0.3 micron, or even at least about 0.5 microns. Still, the average thickness of the inner layer may be not greater than about 8 microns, such as not greater than about 7 microns, not greater than about 6 microns, not greater than about 5 microns, or even not greater than about 4 microns. It will be appreciated that the inner layer can have an average thickness within a range between any of the minimum and maximum thicknesses noted above.

The outer layer of the barrier layer can be formed to have a particular thickness. For example, in one embodiment the average thickness of the outer layer can be at least about 0.05 microns, such as least about 0.1 microns, at least about 0.2 microns, at least about 0.3 micron, or even at least about 0.5 microns. Still, in certain embodiments, the outer layer can have an average thickness that is not greater than about 12 microns, not greater than about 10 microns, not greater than about 8 microns, not greater than about 7 microns, not greater than about 6 microns, not greater than about 5 microns, not greater than about 4 microns, or even not greater than about 3 microns. It will be appreciated that the outer layer of the barrier layer can have an average thickness within a range between any of the minimum and maximum thicknesses noted above.

Notably, in at least one embodiment, the inner layer can be formed to have a different average thickness than the average thickness of the outer layer. Such a design may facilitate improved impregnation resistance to certain chemical species while also providing suitable bonding structure for further processing. For example, in other embodiments the inner layer can be formed to have an average thickness that is greater than the average thickness of the outer layer. However, in alternative embodiments, the inner layer may be formed to have an average thickness so that it is less than the average thickness of the outer layer.

According to one particular embodiment, the barrier layer can have a thickness ratio $[t_i:t_o]$ between an average thickness of the inner layer $(t_i)$ and an average thickness of the outer layer $(t_o)$ that can be within a range between about 3:1 and about 1:3. In other embodiments, the thickness ratio can be within a range between about 2.5:1 and about 1:2.5, such as within a range between about 2:1 and about 1:2, within a range between about 1.8:1 and about 1:1.8, within a range between about 1.5:1 and about 1:1.5, or even within a range between about 1.3:1 and about 1:1.3.

Notably, the barrier layer (including at least the inner layer and outer layer) can be formed to have an average thickness that is not greater than about 10 microns. In other embodiments, the average thickness of the barrier layer may be less, such as not greater than about 9 microns, not greater than about 8 microns, not greater than about 7 microns, not greater than about 6 microns, not greater than about 5 microns, or even not greater than about 3 microns. Still, the average thickness of the barrier layer can be at least about 0.05 microns, such as least about 0.1 microns, at least about 0.2 microns, at least about 0.3 micron, or even at least about 0.5 microns. It will be appreciated that the barrier layer can have an average thickness within a range between any of the minimum and maximum thicknesses noted above.

Still, in another embodiment, the substrate may not necessarily include a barrier layer or any coatings on the exterior surface. For example, the substrate may be essentially free of a barrier layer, wherein the substrate is essentially free of a barrier layer. In at least one embodiment, the substrate can be an uncoated wire prior to translating the substrate through a mixture, which will be described herein at step 102. More particularly, the substrate can be a metal wire that is essentially free of any coating layers on an exterior surface prior to the process of translating the wire through a mixture as described in step 102.

Figure 2A:
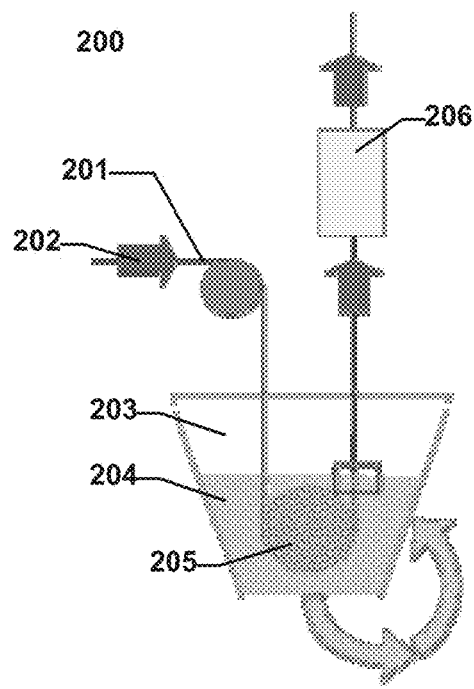
FIG. 2A includes an illustration of a process for forming an abrasive article in accordance with an embodiment.
Figure 2B:
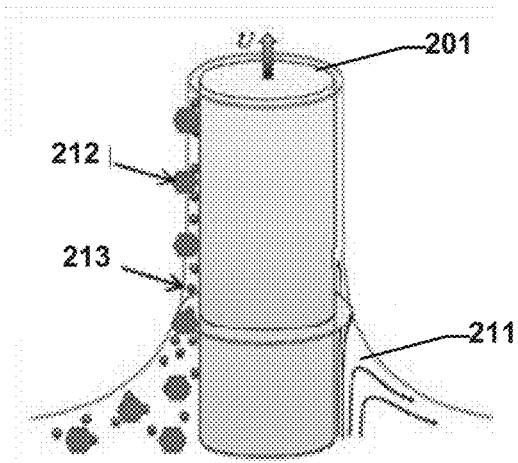
FIG. 2B includes an illustration of a portion of the process of forming an abrasive article in accordance with an embodiment.

After providing the substrate, the process can continue at step 102, which includes translating the substrate through a mixture including abrasive particles and a particulate material including a tacking material. FIG. 2A includes an illustration of a process for forming an abrasive article in accordance with an embodiment. FIG. 2B includes an illustration of a portion of the process of forming an abrasive article in accordance with an embodiment. As illustrated, the substrate 201 can be translated in a direction 202 into a container 203 including a mixture 204. The substrate 201 may be translated over one or more rollers 205 within the container to facilitate control of the direction of the substrate 201 and proper processing.

According to one particular embodiment, the process of forming a portion of the abrasive article can include a slurry dip-coating process, wherein the substrate 201 is translated through a mixture 204 including abrasive particles 212 and a particulate 213 including a tacking material that can facilitate formation of an abrasive article having the features of the embodiments herein. Notably, the mixture 204 can include the abrasive particles 212 and particulate 213, which may facilitate the formation of discrete tacking regions and discrete formations in the finally-formed abrasive article. Moreover, as illustrated and described herein, unlike certain other conventional approaches, the mixture 204 can include the particulate 213 and abrasive particles 212, and thus facilitate simultaneous attachment of both the abrasive particles 212 and particulate 213 to the substrate 201.

Reference herein to abrasive particles is reference to any one of the multiple types of abrasive particle described herein, including for example a first type of abrasive particle or a second type of abrasive particle. The abrasive particles can include a material such as an oxide, a carbide, a nitride, a boride, an oxynitride, an oxyboride, diamond, and a combination thereof. In certain embodiments, the abrasive particles can incorporate a superabrasive material. For example, one suitable superabrasive material includes diamond. In particular instances, the abrasive particles can consist essentially of diamond. As noted herein, the mixture can include more than one type of abrasive particle, including for example, a first type of abrasive particle and a second type of abrasive particle. The first and second types of abrasive particles may have at least one abrasive characteristic that is different compared to each other, wherein the abrasive characteristic can include composition, average particle size, hardness, toughness, friability, structure, shape, or a combination thereof. Moreover, in certain instances, wherein the mixture includes more than one type of abrasive particle, the content of the different types of abrasive particles can be different within the mixture, and therefore, different in the finally-formed abrasive article.

In one embodiment, the abrasive particles can include a material having a Vickers hardness of at least about 10 GPa. In other instances, the abrasive particles can have a Vickers hardness of at least about 25 GPa, such as at least about 30 GPa, at least about 40 GPa, at least about 50 GPa, or even at least about 75 GPa. Still, in at least one non-limiting embodiment, the abrasive particles can have a Vickers hardness that is not greater than about 200 GPa, such as not greater than about 150 GPa, or even not greater than about 100 GPa. It will be appreciated that the abrasive particles can have a Vickers hardness within a range between any of the minimum and maximum values noted above.

The abrasive particles can have a particular shape, such as a shape from the group including elongated, equiaxed, ellipsoidal, boxy, rectangular, triangular, irregular, and the like. Moreover, in certain instances, the abrasive particles can have a particular crystalline structure, including but not limited to multicrystalline, monocrystalline, polygonal, cubic, hexagonal, tetrahedral, octagonal, complex carbon structure (e.g., Bucky-ball), and a combination thereof.

Moreover, the abrasive particles may have a particular grit size distribution that may facilitate improved manufacturing and/or performance of the abrasive article. For example, the abrasive particles can be present in the mixture and on the abrasive article in a normal or Gaussian distribution. In still, other instances, the abrasive particles can be present in the mixture in a non-Gaussian distribution, including for example, a multi-modal distribution or a wide grit size distribution. For a wide grit size distribution, at least 80% of the abrasive particles can have an average particle size contained within a range of at least about 30 microns over a range of average particle sizes between about 1 micron to about 100 microns. In one embodiment, the wide grit size distribution can be a bimodal particle size distribution, wherein the bimodal particle size distribution comprises a first mode defining a first median particle size (M1) and a second mode defining a second median particle size (M2) that is different than the first median particle size. According to a particular embodiment, the first median particle size and second median particle size are at least 5% different based on the equation $((M1-M2)/M1) \times 100\%$. In still other embodiments, the first median particle size and the second median particle size can be at least about 10% different, such as at least about 20% different, at least about 30% different, at least about 40% different, at least about 50% different, at least about 60% different, at least about 70% different, at least about 80% different, or even at least about 90% different. Yet, in another non-limiting embodiment, the first median particle size may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, or even not greater than about 10% different than the second median particle size. It will be appreciated that the difference between the first median particle size and the second median particle size can be within a range between any of the above minimum and maximum percentages.

For a particular embodiment, the abrasive particles can include an agglomerated particle. More particularly, the abrasive particles can consist essentially of agglomerated particles. In certain instances, the mixture may include a combination of agglomerated abrasive particles and unagglomerated abrasive particles. According to an embodiment, an agglomerated particle can include abrasive particles bonded to each other by a binder material. Some suitable examples of a binder material can include an inorganic material, an organic material, and a combination thereof. More particularly, the binder material may be a ceramic, a metal, a glass, a polymer, a resin, and a combination thereof. In at least one embodiment, the binder material can be a metal or metal alloy, which may include one or more transition metal elements. According to an embodiment, the binder material can include at least one metal element from a component layer of the abrasive article, including for example, the barrier layer, the tacking material, the bonding layer, or a combination thereof. In a more particular embodiment, the binder can be a metal material that includes at least one active binding agent. The active binding agent may be an element or composition including a nitride, a carbide, and combination thereof. One particular exemplary active binding agent can include a titanium-containing composition, a chromium-containing composition, a nickel-containing composition, a copper-containing composition and a combination thereof. In another embodiment, the binder material can include a chemical agent configured to chemically react with a workpiece in contact with the abrasive article to facilitate a chemical removal process on the surface of the workpiece while the abrasive article is also conducting a mechanical removal process. Some suitable chemical agents can include oxides, carbides, nitrides, an oxidizer, pH modifier, surfactant, and a combination thereof.

The agglomerated particle of embodiments herein can include a particular content of abrasive particles, a particular content of binder material, and a particular content of porosity. For example, the agglomerated particle can include a greater content of abrasive particle than a content of binder material. Alternatively, the agglomerated particle can include a greater content of binder material than a content of abrasive particle. For example, in one embodiment, the agglomerated particle can include at least about 5 vol % abrasive particle for the total volume of the agglomerated particle. In other instances, the content of abrasive particles for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of abrasive particles in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the abrasive particles in the agglomerated particle can be within a range between any of the above minimum and maximum percentages.

According to another aspect, the agglomerated particle can include at least about 5 vol % binder material for the total volume of the agglomerated particle. In other instances, the content of binder material for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of binder material in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the binder material in the agglomerated particle can be within a range between any of the above minimum and maximum percentages.

In yet another aspect, the agglomerated particle can include a particular content of porosity. For example, the agglomerated particle can include at least about 1 vol % porosity for the total volume of the agglomerated particle. In other instances, the content of porosity for the total volume of the agglomerated particle can be greater, such as at least about 5 vol %, at least about 10 vol %, at least about 20 vol %, at least about 30 vol %, at least about 40 vol %, at least about 50 vol %, at least about 60 vol %, at least about 70 vol %, or even at least about 80 vol %. Yet, in another non-limiting embodiment, the content of porosity in an agglomerated particle for the total volume of the agglomerated particle can be not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the porosity in the agglomerated particle can be within a range between any of the above minimum and maximum percentages.

The porosity within the agglomerated particle can be of various types. For example, the porosity can be closed porosity, generally defined by discrete pores that are spaced apart from each other within the volume of the agglomerated particle. In at least one embodiment, a majority of the porosity within the agglomerated particle can be closed porosity. Alternatively, the porosity can be open porosity, defining a network of interconnected channels extending through the volume of the agglomerated particle. In certain instances, a majority of the porosity can be open porosity.

The agglomerated particle can be sourced from a supplier. Alternatively, the agglomerated particle may be formed prior to the formation of the abrasive article. Suitable processes for forming the agglomerated particle can include screening, mixing, drying, solidifying, electroless plating, electrolyte plating, sintering, brazing, spraying, printing, and a combination thereof.

According to one particular embodiment, the agglomerated particle can be formed in-situ with the formation of the abrasive article. For example, the agglomerated particle may be formed while forming one or more component layers of the abrasive article. Suitable processes for forming the agglomerated particle in-situ with the abrasive article can include a deposition process. Particular deposition processes can include, but are not limited to, plating, electroplating, dipping, spraying, printing, coating, gravity coating, and a combination thereof. In at least one particular embodiment, the process of forming the agglomerated particle comprises simultaneously forming a bonding layer and the agglomerated particle via a plating process.

According to at least one embodiment, the abrasive particles can have a particle coating layer. Notably, the particle coating layer can overlie the exterior surface of the abrasive particles, and more particularly, may be in direct contact with the exterior surface of the abrasive particles. Suitable materials for use as the particle coating layer can include a metal or metal alloy. In accordance with one particular embodiment, the particle coating layer can include a transition metal element, such as titanium, vanadium, chromium, molybdenum, iron, cobalt, nickel, copper, silver, zinc, manganese, tantalum, tungsten, and a combination thereof. One certain particle coating layer can include nickel, such as a nickel alloy, and even alloys having a majority content of nickel, as measured in weight percent as compared to other species present within the first particle coating layer. In more particular instances, the particle coating layer can include a single metal species. For example, the first particle coating layer can consist essentially of nickel. The particle coating layer can be a plated layer, such that it may be an electrolyte plated layer and an electroless plated layer.

The particle coating layer can be formed to overlie at least a portion of the exterior surface of the abrasive particles. For example, the particle coating layer may overly at least about 50% of the exterior surface area of the abrasive particles. In other embodiments, the coverage of the particle coating layer can be greater, such as at least about 75%, at least about 80%, at least about 90%, at least about 95%, or essentially the entire exterior surface of the abrasive particles.

The particle coating layer may be formed to have a particular content relative to the amount of the first type of abrasive particle to facilitate processing. For example, the particle coating layer can be at least about 5% of the total weight of each of the abrasive particles. In other instances, the relative content of the particle coating layer to the total weight of each of the abrasive particles can be greater, such as at least about 10%, at least about 20%, at least about 30%, at least about 40%, at least about 50%, at least about 60%, at least about 70%, or even at least about 80%. Yet, in another non-limiting embodiment, the relative content of the particle coating layer to the total weight of the abrasive particles may be not greater than about 99%, such as not greater than about 90%, not greater than about 80%, not greater than about 70%, not greater than about 60%, not greater than about 50%, not greater than about 40%, not greater than about 30%, not greater than about 20%, or even not greater than about 10%. It will be appreciated that the relative content of the particle coating layer to the total weight of the abrasive particles can be within a range between any of the minimum and maximum percentages noted above.

According to one embodiment, the particle coating layer can be formed to have a particular thickness suitable to facilitate processing. For example, the particle coating layer can have an average thickness of not greater than about 5 microns, such as not greater than about 4 microns, not greater than about 3 microns, or even not greater than about 2 microns. Still, according to one non-limiting embodiment, the particle coating layer can have an average thickness of at least about 0.01 microns, 0.05 microns, at least about 0.1 microns, or even at least about 0.2 microns. It will be appreciated that the average thickness of the particle coating layer can be within a range between any of the minimum and maximum values noted above.

According to certain aspects herein, the particle coating layer can be formed of a plurality of discrete film layers. For example, the particle coating layer can include a first particle film layer overlying the abrasive particles, and a second particle film layer different than the first particle film layer overlying the first particle film layer. The first particle film layer may be in direct contact with an exterior surface of the abrasive particles and the second particle film layer may be in direct contact with the first particle film layer. The first particle film layer and second particle film layer can be distinct from each other based on at least one material parameter such as average thickness, composition, melting temperature, or a combination thereof.

According to at least one embodiment, the abrasive particles may have a particular size that facilitates improved manufacturing and/or performance of the abrasive article. For example, the abrasive particles 212 can have an average particle size (PSa) of not greater than 500 microns, such as not greater than 300 microns, not greater than 200 microns, not greater than 150 microns, not greater than 100 microns, not greater than 80 microns, not greater than 70 microns, not greater than 60 microns, not greater than 50 microns, not greater than 40 microns, not greater than 30 microns or even not greater than 20 microns. Yet, in a non-limiting embodiment, the abrasive particles 212 may have an average particle size (PSa) of at least about 0.1 microns, such as at least about 0.5 microns, at least about 1 micron, at least about 2 microns, at least about 5 microns, or even at least about 8 microns. It will be appreciated that the average particle size can be within a range between any of the above minimum and maximum percentages, including for example, at least 1 micron and not greater than 100 microns or at least 2 microns and not greater than 80 microns.

The mixture 204 can include a particular content of abrasive particles 212, which may facilitate improved manufacturing and/or performance of the abrasive article. For example, the mixture 204 may include at least 5 wt % abrasive particles for a total weight of the mixture. Still, in other instances, the content of the abrasive particles 212 in the mixture 204 can be greater, such as at least 8 wt % or at least 10 wt % or at least 12 wt % or at least 14 wt % or at least 16 wt % or at least 18 wt % or at least 20 wt % or at least 22 wt % or at least 24 wt % or at least 26 wt % or at least 28 wt % or at least 30 wt % or at least 32 wt % or at least 34 wt % or at least 36 wt % or at least 38 wt % or at least 40 wt % or at least 42 wt % or at least 44 wt % or at least 46 wt % or at least 48 wt % or at least 50 wt % for a total weight of the mixture. Still, in at least one non-limiting embodiment, the content of abrasive particles 212 in the mixture 204 can be not greater than 80 wt %, such as not greater than 75 wt % or not greater than 70 wt % or not greater than 65 wt % or not greater than 60 wt % or not greater than 55 wt % or not greater than 50 wt % or not greater than 45 wt % or not greater than 40 wt % or not greater than 30 wt % or not greater than 25 wt % or not greater than 20 wt % for a total weight of the mixture. It will be appreciated that the mixture 204 can include a content of the abrasive particles 212 within a range including any of the minimum and maximum percentages noted above. Furthermore, the content of the abrasive particles 212 in the mixture 204 can be controlled and modified depending upon the size (e.g., width or diameter) of the substrate, the average particle size of the abrasive particles, and the desired concentration of abrasive particles present on the substrate in the finally-formed abrasive article.

As described herein, mixture 204 may further include a particulate 213, which can include a tacking material. The particulate 213 may be a powder material, such as a raw material powder suitable for forming discrete tacking regions and discrete formations as described in embodiments herein. The particulate 213 may consist essentially of a tacking material. The particulate 213 may facilitate provisional bonding of the abrasive particles 212 to the substrate 201 until further processing, which can include the application of a bonding layer, can be completed to permanently secure the abrasive particles to the substrate 201.

In accordance with an embodiment, the tacking material can be formed from a metal, metal alloy, metal matrix composite, and a combination thereof. In one particular embodiment, the tacking material can be formed of a material including a transition metal element. For example, the tacking material can be a metal alloy including a transition metal element. Some suitable transition metal elements can include, lead, silver, copper, zinc, indium, tin, titanium, molybdenum, chromium, iron, manganese, cobalt, niobium, tantalum, tungsten, palladium, platinum, gold, ruthenium, and a combination thereof. According to one particular embodiment, the tacking material can be made of a metal alloy including tin and lead. In particular, such metal alloys of tin and lead may contain a majority content of tin as compared to lead, including but not limited to, a tin/lead composition of at least about 60/40.

In another embodiment, the tacking material can be made of a material having a majority content of tin. In fact, in certain abrasive articles, the tacking material may consist essentially of tin. The tin, alone or in the solder, can have a purity of at least about 99%, such as at least about 99.1%, at least about 99.2%, at least about 99.3%, at least about 99.4%, at least about 99.5%, at least about 99.6%, at least about 99.7%, at least about 99.8%, or even at least about 99.9%. In another aspect, the tin can have a purity of at least about 99.99%. In one particular instance, the tacking material can include a matte tin material. The tacking material may have an organic content of not greater than about 0.5 wt % for a total weight of the plated material (i.e., the tacking layer).

In accordance with an embodiment, the tacking material can be a solder material. It will be appreciated that a solder material may include a material having a particular melting point, such as not greater than about 450° C. Solder materials are distinct from braze materials, which generally have significantly higher melting points than solder materials, such as greater than 450° C., and more typically, greater than 500° C. Furthermore, brazing materials may have different compositions. In accordance with an embodiment, the tacking material of the embodiments herein may be formed of a material having a melting point of not greater than about 400° C., such as not greater than about 375° C., not greater than about 350° C., not greater than about 300° C., or even not greater than about 250° C. Still, the tacking material may have a melting point of at least about 100° C., such as at least about 125° C., at least about 150° C., or even at least about 175° C. It will be appreciated that the tacking material can have a melting point within a range between any of the minimum and maximum temperatures noted above.

According to one embodiment, the tacking material can include a same material as the barrier layer, such that the compositions of the barrier layer and the tacking material share at least one element in common. In yet an alternative embodiment, the barrier layer and the tacking material can be entirely different materials.

According to at least one embodiment, the particulate including the tacking material may have a certain particle size that facilitates improved manufacturing and/or performance of the abrasive article. For example, the particulate 213 can have an average particle size (PSp) of not greater than 50 microns, such as not greater than 40 microns, not greater than 30 microns, not greater than 25 microns, not greater than 20 microns, not greater than 18 microns, not greater than 15 microns, not greater than 12 microns, not greater than 10 microns, not greater than 8 microns, not greater than 5 microns or even not greater than 3 microns. Yet, in a non-limiting embodiment, the particulate 213 may have an average particle size (PSp) of at least about 0.01 microns, such as at least about 0.05 microns, at least about 0.1 microns, at least about 0.22 microns, at least about 0.5 microns, or even at least about 1 micron. It will be appreciated that the average particle size can be within a range between any of the above minimum and maximum percentages, including for example, at least 0.01 micron and not greater than 50 microns, at least 0.1 microns and not greater than 10 microns or even at least 0.5 microns and not greater than 7 microns.

The mixture 204 can include a particular content of the particulate 213 including the tacking material, which may facilitate improved manufacturing and/or performance of the abrasive article. For example, the mixture 204 may include at least 0.1 wt % particulate for a total weight of the mixture. Still, in other instances, the content of the particulate 213 in the mixture 204 can be greater, such as at least 0.2 wt % or at least 0.3 wt % or at least 0.4 wt % or at least 0.5 wt % or at least 0.8 wt % or at least 1 wt % or at least 1.2 wt % or at least 1.5 wt % or at least 1.8 wt % or at least 2 wt % or at least 2.2 wt % or at least 2.5 wt % or at least 2.8 wt % or at least 3 wt % or at least 4 wt % or at least 5 wt % or at least 6 wt % or at least 7 wt % or at least 8 wt % or at least 9 wt % or at least 10 wt % for a total weight of the mixture. Still, in at least one non-limiting embodiment, the content of the particulate 213 including the tacking material in the mixture 204 can be not greater than 25 wt %, such as not greater than 22 wt % or not greater than 20 wt % or not greater than 18 wt % or not greater than 15 wt % or not greater than 12 wt % or not greater than 10 wt % or not greater than 9 wt % or not greater than 8 wt % or not greater than 7 wt % or not greater than 6 wt % or not greater than 5 wt % or not greater than 4 wt % or not greater than 3 wt % for a total weight of the mixture. It will be appreciated that the mixture 204 can include a content of the particulate 213 including the tacking material within a range including any of the minimum and maximum percentages noted above, including for example, at least 0.2 wt % and not greater than 20 wt % or even at least 0.5 wt % and not greater than 10 wt %. Furthermore, the content of the particulate in the mixture 204 can be controlled and modified depending upon the size (e.g., width or diameter) of the substrate, the average particle size of the abrasive particles, and the desired concentration of abrasive particles present on the substrate in the finally-formed abrasive article.

According to another embodiment, the mixture 204 can include abrasive particles 212 and particulate 213 having a certain relationship in their respective average particles sizes which can facilitate improved manufacturing and/or performance of the abrasive article. For example, the mixture 204 can include abrasive particles 212 having an average particle size (PSa) and the particulate having an average particles size (PSp), wherein the mixture 204 can be formed to have a ratio (PSp/PSa) of not greater than 1. In other instances, the ratio (PSp/PSa) can be less, such as not greater than 0.9 or not greater than 0.8 or not greater than 0.7 or not greater than 0.6 or not greater than 0.5 or not greater than 0.4 or not greater than 0.3 or not greater than 0.2 or not greater than 0.18 or not greater than 0.16 or not greater than 0.15 or not greater than 0.014 or not greater than 0.13 or no greater than 0.12 or not greater than 0.11 or not greater than 0.1 or not greater than 0.09 or not greater than 0.08 or not greater than 0.07 or not greater than 0.06 or no greater than 0.05 or not greater than 0.04 or not greater than 0.03 or not greater than 0.02. Still, in at least one non-limiting embodiment, the mixture 204 can be formed to have a ratio (PSp/PSa) of at least 0.01, such as at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14 or at least 0.15 or at least 0.16 or at least 0.17 or at least 0.18 or at least 0.19 or at least 0.2 or at least 0.3 or at least 0.4 or at least 0.5 or at least 0.6 or at least 0.7 or at least 0.8 or at least 0.9. It will be appreciated that the mixture 204 can have a ratio (PSp/PSa) within a range including any of the minimum and maximum values noted above, including for example, at least 0.01 and not greater than 1, at least 0.01 and not greater than 0.5 or even at least about 0.025 and not greater than about 0.25. Furthermore, the ratio (PSp/PSa) may be controlled and modified depending upon the size (e.g., width or diameter) of the substrate and the desired concentration of abrasive particles present on the substrate in the finally-formed abrasive article.

According to another embodiment, the mixture 204 can include abrasive particles 212 and particulate 213 having a certain relationship in their respective contents within the mixture, as measured in weight percent, which can facilitate improved manufacturing and/or performance of the abrasive article. For example, the mixture 204 a content of abrasive particles (Cap) and a content of the particulate (Cp) wherein the mixture 204 can be formed to have a ratio (Cp/Cap) of not greater than 10. In other instances, the ratio (Cp/Cap) can be less, such as not greater than 5 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.18 or not greater than 0.16 or not greater than 0.15 or not greater than 0.014 or not greater than 0.13 or no greater than 0.12 or not greater than 0.11 or not greater than 0.1 or not greater than 0.09 or not greater than 0.08 or not greater than 0.07 or not greater than 0.06 or no greater than 0.05 or not greater than 0.04 or not greater than 0.03 or not greater than 0.02. Still, in at least one non-limiting embodiment, the mixture 204 can be formed to have a ratio (Cp/Cap) of at least 0.001 or at least 0.0025 or at least 0.004 or at least 0.006 or at least 0.008 or at least 0.01 or at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14 or at least 0.15 or at least 0.16 or at least 0.17 or at least 0.18 or at least 0.19 or at least 0.2 or at least 0.3 or at least 0.4 or at least 0.5 or at least 0.6 or at least 0.7 or at least 0.8 or at least 0.9. It will be appreciated that the mixture 204 can have a ratio (Cp/Cap) within a range including any of the minimum and maximum values noted above, including for example, at least 0.001 and not greater than 1, even at least 0.01 and not greater than 0.5 or even at least 0.025 and not greater than 0.25. Furthermore, the ratio (Cp/Cap) may be controlled and modified depending upon the size (e.g., width or diameter) of the substrate and the desired concentration of abrasive particles present on the substrate in the finally-formed abrasive article.

According to another embodiment, the mixture 204 can include a carrier for suspending the abrasive particles 212, particulate 213 and any additives therein. According to one embodiment, the carrier can include water, such that the mixture is an aqueous-based slurry.

In another embodiment, the mixture 204 may include certain additives. For example, the mixture 204 can include a flux material 211, which may be applied to the substrate 201 as it is translated through the mixture 204. According to one particular embodiment, during processing, the flux material 211 may form a generally continuous and conformal coating on the substrate 201 as it is translated and exits the mixture 204, which can facilitate suitable coupling of the abrasive particles 212 and particulate 213 to the substrate 201. The flux material 211 can be in the form of a liquid or paste. For at least one exemplary embodiment, the flux material 211 can include a material such as a chloride, an acid, a surfactant, a solvent, organics, water and a combination thereof. In one particular embodiment, the flux material 211 can include hydrochloride, zinc chloride, and a combination thereof.

As illustrated in FIGS. 2A and 2B, the process can be conducted such that at least a portion of the abrasive particles 212, particulate 213 and flux 211 from the mixture are attached to the substrate 201. Notably, as the substrate 201 exits the mixture 204, a layer of material including a flux material 211, abrasive particles 212, and the particulate 213 including the tacking material can be simultaneously attached to the substrate 201. It will be appreciated that the rheology of the mixture 204 and the rate of translation of the substrate 201 may be controlled to facilitate suitable application of the flux material 211, abrasive particles 212 and particulate 213 to the substrate 201. Notably, the process of attaching the flux material 211, abrasive particles 212 and particulate 213 to the substrate 201 can be conducted at a temperature within a range including at least 1° C. and not greater than 300° C. Notably, this temperature range may ensure that the particulate material is in a solid phase, as opposed to a liquid (e.g., molten or melted) phase, which can facilitate the formation of an abrasive article having the features of the embodiments herein. Notably, the particulate 213 in the mixture 204 can be in a solid form and in a solid form when initially attached to the substrate 201. Later processing may change the phase of the particulate 213 from a solid phase to a liquid phase, such as during the processing of treating.

The mixture 204 may be formed to have certain characteristics that facilitate the forming process, including for example, a viscosity. According to an embodiment, the mixture 204 may be a Newtonian fluid having a viscosity of at least 0.1 mPa s and no more than 1 Pa s at a temperature of 25° C. and a shear rate of 1 l/s. The mixture 204 can also be a non-Newtonian fluid having a viscosity of at least 1 mPa s and no more than 100 Pa s, or even not greater than about 10 Pa s, at the shear rate of 10 l/s as measured at a temperature of 25° C. Viscosity can be measured using a TA Instruments AR-G2 rotational rheometer using 25 mm parallel plates, a gap of approximately 2 mm, shear rates of 0.1 to 10 l/s at a temperature of 25° C. One or more viscosity modifiers may be added as an additive to the mixture 204. For example, the mixture 204 may include a minor content of additives, of which may include a viscosity modifier. Some suitable viscosity modifiers can include organic materials, such as glycerin, ethylene glycol, propylene glycol, and the like.

After translating the substrate 201 through the mixture 204 at step 102, the process can continue by treating the substrate to form an abrasive article preform at step 103. According to one embodiment, treating includes heating the preform to a temperature within a range including at least 100° C. and not greater than 450° C. The treating process may facilitate melting of at least a portion of the particulate 213 to a fluid or semi-fluid state, such that at least a portion of the particulate 213 contacts at least a portion of the abrasive particles and provisionally bonds the abrasive particles 212 to the surface of the substrate 212. Moreover, the treating process may also facilitate accumulation of certain portions of only the particulate material on the surface of the substrate 201, such that certain discrete formations may be formed. Treating may include translating the substrate 201 through a heater 206 to facilitate heating and formation of the abrasive article preform having abrasive particles 212 provisionally bonded to the surface of the substrate 201 at discrete tacking regions and also the formation of discrete formations as will be described herein. As will also be appreciated in light of the disclosure, the process of attaching abrasive particles 212, particulate 213, and flux material 211 to the surface of the substrate 201 and treating the article may facilitate formation of a discontinuous coating of tacking material on the surface of the substrate 201.

After treating, the abrasive article preform may be cleaned to remove excess flux and other unwanted materials in preparation for further processing. According to one embodiment, the cleaning process may utilize one or a combination of water, acids, bases, surfactants, catalysts, solvents, and a combination thereof. In one particular embodiment, the cleaning process can be a staged process, starting with a rinse of the abrasive article using a generally neutral material, such as water or deionized water. The water may be room temperature or hot, having a temperature of at least about 40° C. After the rinsing operation the cleaning process may include an alkaline treatment, wherein the abrasive article is traversed through a bath having a particular alkalinity, which may include an alkaline material. The alkaline treatment may be conducted at room temperature, or alternatively, at elevated temperatures. For example, the bath of the alkaline treatment may have a temperature of at least about 40° C., such at least about 50° C., or even at least about 70° C., and not greater than about 200° C. The abrasive article may be rinsed after the alkaline treatment.

After the alkaline treatment, the abrasive article may undergo an activation treatment. The activation treatment may include traversing the abrasive article through a bath having a particular element or compound, including an acid, a catalyst, a solvent, a surfactant, and a combination thereof. In one particular embodiment, the activation treatment can include an acid, such as a strong acid, and more particularly hydrochloric acid, sulfuric acid, and a combination thereof. In some instances, the activation treatment can include a catalyst that may include a halide or halide-containing material. Some suitable examples of catalysts can include potassium hydrogen fluoride, ammonium bifluoride, sodium bifluoride, and the like.

The activation treatment may be conducted at room temperature, or alternatively, at elevated temperatures. For example, the bath of the activation treatment may have a temperature of at least about 40° C., but not greater than about 200° C. The abrasive article may be rinsed after the activation treatment.

According to one embodiment, after suitably cleaning the abrasive article, an optional process may be utilized to facilitate the formation of abrasive particles having exposed surfaces after complete formation of the abrasive article. For example, in one embodiment, an optional process of selectively removing at least a portion of the particle coating layer on the abrasive particles may be utilized. The selective removal process may be conducted such that the material of the particle coating layer is removed while other materials of the abrasive article, including for example, the tacking layer are less affected, or even essentially unaffected. According to a particular embodiment, the process of selectively removing comprises etching. Some suitable etching processes can include wet etching, dry etching, and a combination thereof. In certain instances, a particular etchant may be used that is configured to selectively remove the material of the particle coating layer of the abrasive particles and leaving the tacking layer intact. Some suitable etchants can include nitric acid, sulfuric acid, hydrochloride acid, organic acid, nitric salt, sulfuric salt, chloride salt, alkaline cyanide based solutions, and a combination thereof.

After treating at step 103, the process may continue with the formation of a bonding layer on the abrasive article preform at step 104. Formation of the bonding layer can facilitate formation of an abrasive article having improved performance, including but not limited to, wear resistance and particle retention. In accordance with an embodiment, the bonding layer can be bonded directly to the abrasive particles, portions of the tacking material, and portions of the substrate.

Forming the bonding layer can include a deposition process. Some suitable deposition processes can include plating (electrolyte or electroless), spraying, dipping, printing, coating, and a combination thereof. In accordance with one particular embodiment, the bonding layer can be formed by a plating process. For at least one particular embodiment, the plating process can be an electrolyte plating process. In another embodiment, the plating process can include an electroless plating process.

The bonding layer can overlie a majority of an external surface of the substrate and an external surface of the abrasive particles. Moreover, in certain instances, the bonding layer can overlie a majority of an external surface of the substrate and an external surface of the abrasive particles. In certain embodiments, the bonding layer can be formed such that it overlies at least 90% of the exterior surface of the abrasive article preform and the finally-formed abrasive article. In other embodiments, the coverage of the bonding layer can be greater, such that it overlies at least about 92%, at least about 95%, or even at least about 97% of the entire abrasive article preform and finally-formed abrasive article. In one particular embodiment, the bonding layer can be formed such that it overlies essentially all of the external surfaces of the abrasive article. Still, in an alternative embodiment, the bonding layer can be selectively placed, such that exposed regions can be formed on the abrasive article.

The bonding layer can be made of a particular material, such as an organic material, inorganic material, and a combination thereof. Some suitable organic materials can include polymers such as a UV curable polymer, thermosets, thermoplastics, and a combination thereof. Some other suitable polymer materials can include urethanes, epoxies, polyimides, polyamides, acrylates, polyvinyls, and a combination thereof.

Suitable inorganic materials for use in the bonding layer can include metals, metal alloys, cermets, ceramics, composites, and a combination thereof. In one particular instance, the bonding layer can be formed of a material having at least one transition metal element, and more particularly, a metal alloy containing a transition metal element. Some suitable transition metal elements for use in the bonding layer can include nickel, lead, silver, copper, zinc, tin, titanium, molybdenum, chromium, iron, manganese, cobalt, niobium, tantalum, tungsten, palladium, platinum, gold, ruthenium, or a combination thereof. In certain instances, the bonding layer can include nickel, and may be a metal alloy comprising nickel, or even a nickel-based alloy. In still other embodiments, the bonding layer can consist essentially of nickel.

In accordance with one embodiment, the bonding layer can be made of a material, including for example, composite materials, having a hardness that is greater than a hardness of the tacking material. For example, the bonding layer can have a Vickers hardness that is at least about 5% harder than a Vickers hardness of the tacking material based on the absolute values of the equation $((Hb-Ht)/Hb) \times 100\%$, wherein Hb represents the hardness of the bonding layer and Ht represents the hardness of the tacking layer. In one embodiment, the bonding layer can be at least about 10% harder, such as at least about 20% harder, at least about 30% harder, at least about 40% harder, at least about 50% harder, at least about 75% harder, at least about 90% harder, or even at least about 99% harder than the hardness of the tacking layer. Yet, in another non-limiting embodiment, the bonding layer may be not greater than about 99% harder, such as not greater than about 90% harder, not greater than about 80% harder, not greater than about 70% harder, not greater than about 60% harder, not greater than about 50% harder, not greater than about 40% harder, not greater than about 30% harder, not greater than about 20% harder, not greater than about 10% harder than the hardness of the tacking material. It will be appreciated that the difference between the hardness of the bonding layer and the tacking material can be within a range between any of the above minimum and maximum percentages.

Additionally, the bonding layer can have a fracture toughness (K1c) as measured by indentation method, that is at least about 5% greater than an average fracture toughness of the tacking material based on the absolute values of the equation $((Tb-Tt)/Tb) \times 100\%$, wherein Tb represents the fracture toughness of the bonding layer and Tt represents the fracture toughness of the tacking material. In one embodiment, the bonding layer can have a fracture toughness of at least about 8% greater, such as at least about 10% greater, at least about 15% greater, at least about 20% greater, at least about 25% greater, at least about 30% greater, or even at least about 40% greater than the fracture toughness of the tacking material. Yet, in another non-limiting embodiment, the fracture toughness of the bonding layer may be not greater than about 90% greater, such as not greater than about 80% greater, not greater than about 70% greater, not greater than about 60% greater, not greater than about 50% greater, not greater than about 40% greater, not greater than about 30% greater, not greater than about 20% greater, or even not greater than about 10% greater than the fracture toughness of the tacking material. It will be appreciated that the difference between the fracture toughness of the bonding layer and the fracture toughness of the tacking material can be within a range between any of the above minimum and maximum percentages.

Optionally, the bonding layer can include a filler material. The filler can be various materials suitable for enhancing performance properties of the finally-formed abrasive article. Some suitable filler materials can include abrasive particles, pore-formers such as hollow sphere, glass spheres, bubble alumina, natural materials such as shells and/or fibers, metal particles, graphite, lubricious material and a combination thereof.

In one particular embodiment, the bonding layer can be formed by an electrolytic plating process and one or more additives, such as wetting agents, hardeners, stress reducers and leveling agents, can be included in the plating solution to produce bonding layer with desired properties and may facilitate performance of the abrasive article. For example, additives containing sulfur or materials that will form sulfur in the finally-formed layer can be included in the plating solution to produce bonding layer with sulfur for controlled hardness and tensile stress. Some suitable examples of such additives can include saccharin, metabenzene disulfonic acid, sodium benzene sulfonate, and the like. The bonding layer may include a particular content of sulfur, such as at least 50 ppm sulfur for a total weight of the bonding layer. Still, in other instances, the content of the sulfur in the bonding layer can be greater, such as at least 60 ppm or at least 70 ppm or at least 80 ppm or at least 90 ppm or at least 100 ppm or at least 120 ppm or at least 140 ppm or at least 160 ppm or at least 180 ppm or at least 200 ppm or at least 250 ppm or at least 300 ppm or at least 350 ppm or at least 400 ppm for a total weight of the bonding layer. Still, in at least one non-limiting embodiment, the content of the sulfur in the bonding layer can be not greater than 2000 ppm, such as not greater than 1500 ppm or not greater than 1000 ppm or not greater than 900 ppm or not greater than 800 ppm or not greater than 700 ppm or not greater than 600 ppm or not greater than 500 ppm for a total weight of the bonding layer. It will be appreciated that the content of sulfur in the bonding layer can be within a range including any of the minimum and maximum percentages noted above.

In one particular embodiment, the bonding layer can include a filler in the form of abrasive particles, which can be the same as or different from the abrasive particles 212 contained in the mixture and attached to the substrate 201. The abrasive particle filler can be significantly different than the abrasive particles 212, particularly with regard to size, such that in certain instances the abrasive particle filler can have an average particle size that is substantially less than the average particle size of the abrasive particles 212. For example, the abrasive particle filler can have an average grain size that is at least about 2 times less than the average particle size of the abrasive particles 212. In fact, the abrasive filler may have an average particle size that is even smaller, such as on the order of at least 3 times less, such as at least about 5 times less, at least about 10 times less, and particularly within a range between about 2 times and about 10 times less than the average particle size of the abrasive particles 212.

The abrasive grain filler within the bonding layer can be made from a material such as carbides, carbon-based materials (e.g. fullerenes), diamond, borides, nitrides, oxides, oxynitrides, oxyborides, and a combination thereof. In particular instances, the abrasive grain filler can be a superabrasive material such as diamond, cubic boron nitride, or a combination thereof.

After forming the bonding layer at step 106, the process may optionally include forming a coating layer overlying the bonding layer. In at least one instance, the coating layer can be formed such that it is in direct contact with at least a portion of the bonding layer. Forming of the coating layer can include a deposition process. Some suitable deposition processes can include plating (electrolyte or electroless), spraying, dipping, printing, coating, and a combination thereof.

The coating layer can include an organic material, an inorganic material, and a combination thereof. According to one aspect, the coating layer can include a material such as a metal, metal alloy, cermet, ceramic, organic, glass, and a combination thereof. More particularly, the coating layer can include a transition metal element, including for example, a metal from the group of titanium, vanadium, chromium, molybdenum, iron, cobalt, nickel, copper, silver, zinc, manganese, tantalum, tungsten, and a combination thereof. For certain embodiments, the coating layer can include a majority content of nickel, and in fact, may consist essentially of nickel. Alternatively, the coating layer can include a thermoset, a thermoplastic, and a combination thereof. In one instance, the coating layer includes a resin material and may be essentially free of a solvent.

In one particular embodiment, the coating layer can include a filler material, which may be a particulate material. For certain embodiments, the coating layer filler material can be in the form of abrasive particles, which may be the same as or different from the abrasive particles 212 attached to the substrate 201. Certain suitable types of abrasive particles for use as the coating layer filler material can include carbides, carbon-based materials (e.g., diamond), borides, nitrides, oxides, and a combination thereof. Some alternative filler materials can include pore-formers such as hollow sphere, glass spheres, bubble alumina, natural materials such as shells and/or fibers, metal particles, and a combination thereof.

The coating filler material may be significantly different than the abrasive particles 212, particularly with regard to size, such that in certain instances the coating layer filler material can have an average particle size that is substantially less than the average particle size of the abrasive particles 212. For example, the coating layer filler material can have an average particle size that is at least about 2 times less than the average particle size of the abrasive particles 212. In fact, the coating layer filler material may have an average particle size that is even smaller, such as on the order of at least 3 times less, such as at least about 5 times less, at least about 10 times less, and particularly within a range between about 2 times and about 10 times less than the average particle size of the abrasive particles 212.

Figure 3:
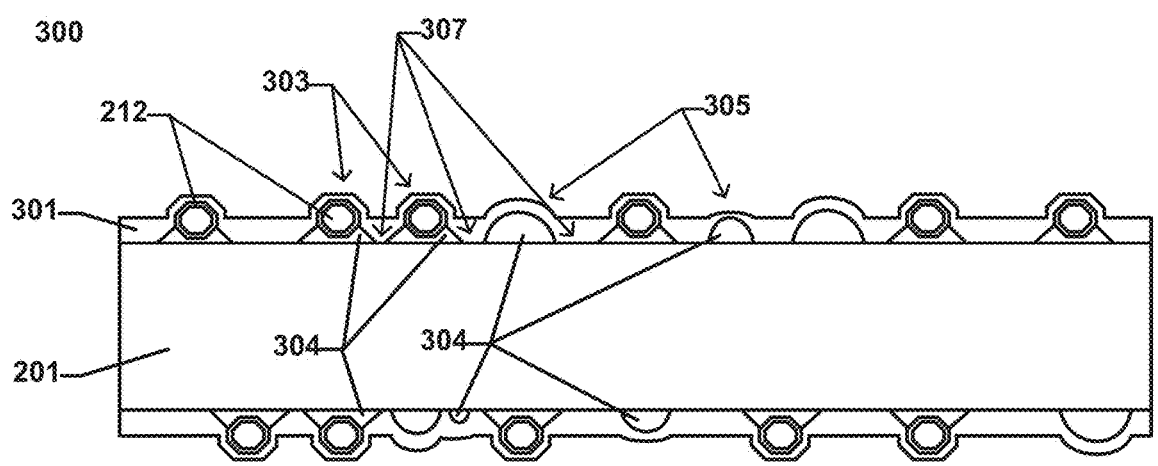
FIG. 3 includes an illustration of a portion of an abrasive article in accordance with an embodiment.

FIG. 3 includes a cross-sectional illustration of an abrasive article formed according to an embodiment. As illustrated, the abrasive article 300 can include a substrate 201, which is in the form of an elongated body, such as a wire. As further illustrated, the abrasive article 300 can include a plurality of discrete tacking regions 303 overlying the external surface of the substrate 201. The abrasive article 300 can further include abrasive particles 212, which can be bonded to the substrate 201 at the discrete tacking regions 303. The abrasive article 300 can further include discrete formations 305 which can overlie the substrate 201. Moreover, the abrasive article 300 can include a bonding layer 301 overlying the substrate 201, abrasive particles 212, discrete tacking regions 303 and discrete formations 305. While not illustrated, it will be appreciated that the abrasive article may include other component layers described herein, including for example, a barrier layer, coating layer, and the like.

According to one embodiment, the discrete tacking regions 303 can be defined by discrete portions of the tacking material 304, which may be bonded to an abrasive particle 212 for provisional bonding of the abrasive particles 212 to the substrate 201 during processing. Due to the method of processing, the particulate material closest to the abrasive particles during treatment may preferentially gather around the abrasive particles, thus forming discrete tacking regions as opposed to a continuous and conformal coating of tacking material 304. Accordingly, the discrete tacking regions 303 can include a tacking material 304, wherein the tacking material has any of the features of the tacking material described herein. For example, as illustrated, the discrete tacking regions 303 can be a discontinuous distribution of features, such as the portions of the tacking material 304 overlying the substrate. In certain instances, at least one discrete tacking region can be isolated and spaced apart from another discrete tacking region, such that the region between the discrete tacking regions is essentially free of tacking material 304. Accordingly, the tacking material 304 on the surface of the substrate 201 defines a discontinuous layer, defining openings or gaps wherein the upper surface of the substrate 201 can be essentially free of the tacking material 304. The discrete tacking regions 303 can be bonded directly to the substrate 201. For one embodiment, essentially the entire abrasive article can include discrete tacking regions 303 and the abrasive article 303 can be essentially free of a continuous layer of tacking material 304.

At least a portion discrete tacking regions 303 can be separated from each other by gap regions 307, which define portions of the abrasive article where there is no tacking material 304 underlying the bonding layer 301. Accordingly, the bonding layer 301 can be in direct contact with and bonded directly to the substrate 201 in the gap regions 307. In certain instances, the abrasive article 300 may have a greater content (as measured in area) of the gap regions 307 on the surface of the abrasive article 300 compared to the content of discrete tacking regions 303. In still other embodiments, the abrasive article 300 may have a greater content (as measured in area) of the discrete tacking regions 303 on the surface of the abrasive article 300 compared to the content of gap regions 307.

Furthermore, as illustrated in FIG. 3, the discrete tacking regions 303 can be randomly distributed on the surface of the substrate 201. Accordingly, the size and arrangement of the discrete tacking regions 303 may be random. Moreover, the size and arrangement of the gap regions 307 may also be random.

In one embodiment, the abrasive article 300 includes discrete formations 305 overlying the substrate 201, and more particularly, bonded directly to the substrate 201. Each of the discrete formations 305 can be bonded directly to the substrate 201. According to one embodiment, at least one of the discrete formations 305 can include a metal material. More particularly, each of the discrete formations 305 can include a metal material, such as the tacking material 304. In at least one embodiment, the discrete formations 305 can consist essentially of the tacking material 303, and may have essentially the same composition as the tacking material 304 of the discrete tacking regions 304. The discrete formations 305 can include the tacking material 304 and can have any of the features of the tacking material 304 as described in embodiments herein. For example, the discrete formations can include a solder material, may include tin, and more particularly, may consist essentially of tin. The discrete tacking regions 303 and discrete formations 305 may include a material that is essentially free of an intermetallic material.

As illustrated in FIG. 3, the discrete formations 305 may be randomly distributed on the surface of the substrate 201. Accordingly, the size and arrangement of the discrete formations 305 may be random. Moreover, the size and arrangement of the gap regions 307 may also be random. As further illustrated, the discrete formations 305 may vary in size and shape with respect to each other.

In one embodiment, at least one discrete formation 305 can be separate from another discrete formation by a gap region 307. That is, a gap region 307 can extend between and separate at least two discrete formations 305, such that there is a gap in the material forming each of the discrete formations 305 that is filled by the bonding layer 301. Moreover, at least one discrete formation 305 can be separated from a discrete tacking region 303 by a gap region. Likewise, a gap region 307 can extend between and separate the discrete formation 305 from the discrete tacking region 303, such that there is a gap in the material forming the discrete formation 305 and discrete tacking region 303 that is filled by the bonding layer 301. In at least one embodiment, the discrete formations 305 can be essentially free of abrasive particles 212.

In at least one embodiment, the discrete formations 305 can have a generally rounded shape, as viewed in cross-section and/or top down. The discrete formations 305 may be formed form the particulate during processing that was not near an abrasive particle, but due to processing conditions, accumulated at a location on the surface of the substrate 201. Accordingly, the discrete formations 305 can be spaced apart from the abrasive particles, and may be characterized as regions on the surface of the substrate 201 that are not bonded to or associated with an abrasive particle. By contrast, the discrete tacking regions 303 are discrete or isolated regions on the surface of the substrate 201 and have at least one abrasive particle that is associated with the region and bonded therein.

Without wishing to be tied to a particular theory, it is thought that the existence of the discrete formations 305 may act as crack arrestors during operation of the abrasive article for any cracks that may be initiated in the bonding layer. Unlike a continuous coating of material, the discontinuous coating of tacking material characterized by the discrete tacking regions 303 and discrete formations 305 may improve crack arresting and improve the abrasive capabilities of the abrasive article.

As further illustrated, the bonding layer 301 can be overlying the substrate 201, abrasive particles 212, discrete tacking regions 303, and discrete formations 305. In particular instances, the bonding layer 301 can be in direct contact with and bonded directly to the substrate 201, abrasive particles 212, discrete tacking regions 303, and discrete formations 305.

According to another embodiment, the abrasive article 300 may include a particular content of metal material (e.g., tacking material) in the plurality of discrete tacking regions 303 and plurality of discrete formations 305 that may facilitate improved manufacturing and/or performance. For example, the abrasive article 300 can include a content of metal ($C_{mm}$) in the in the plurality of discrete tacking regions 303 and plurality of discrete formations 305 of not greater than 2 g/km, wherein $C_{mm}$ is measured as grams of metal material per kilometer of the length of the abrasive article 300. In still another embodiment, the content of metal material ($C_{mm}$) can be not greater than 1 g/km or not greater than 0.8 g/km or not greater than 0.6 g/km or not greater than 0.4 g/km or not greater than 0.2 g/km or not greater than 0.1 g/km or not greater than 0.08 g/km or not greater than 0.06 g/km or not greater than 0.04 g/km or not greater than 0.02 g/km or even not greater than 0.01 g/km. Still, in another non-limiting embodiment, the content of metal material ($C_{mm}$) in the plurality of discrete tacking regions 303 and plurality of discrete formations 305 can be at least 0.001 g/km, such as at least 0.002 g/km or at least 0.004 g/km or at least 0.006 g/km or at least 0.008 g/km or at least 0.01 g/km or at least 0.02 g/km or at least 0.04 g/km or at least 0.06 g/km or at least 0.08 g/km or at least 0.01 g/km. It will be appreciated that the content of metal material ($C_{mm}$) in the in the plurality of discrete tacking regions 303 and plurality of discrete formations 305 can be within a range including any of the minimum and maximum values noted above.

In still another embodiment, the abrasive article 300 may be formed to have a particular relationship between the content of metal ($C_{mm}$) and the content of abrasive particles 212, which can be represented by $C_{ap}$, wherein $C_{ap}$ defines the grams of abrasive particles 212 per kilometer of length of the abrasive article 300. The $C_{mm}$ and $C_{ap}$ of an abrasive article 300 may be calculated by any standard analysis method, such as, inductively coupled plasma mass spectrometry. In particular, the following method may be used to calculate the $C_{mm}$ and $C_{ap}$ of an abrasive article: 1) a set length of abrasive article 300 may be dissolved in hot acid, 2) the abrasive grains may be retrieved through filtering and their weight determined, 3) the weight of the metal (i.e., tacking material) in the acid solution may be determined using inductively coupled plasma spectrometry, and 4) the Cmm and Cap per the set length of abrasive article 300 may be calculated. According to one embodiment, the abrasive article can be formed to have a particular ratio (Cmm/Cap) of not greater than 1, such as not greater than 0.9 or not greater than 0.8 or not greater than 0.7 or not greater than 0.6 or not greater than 0.5 or not greater than 0.4 or not greater than 0.3 or not greater than 0.2 or not greater than 0.18 or not greater than 0.16 or not greater than 0.15 or not greater than 0.014 or not greater than 0.13 or no greater than 0.12 or not greater than 0.11 or not greater than 0.1 or not greater than 0.09 or not greater than 0.08 or not greater than 0.07 or not greater than 0.06 or no greater than 0.05 or not greater than 0.04 or not greater than 0.03 or even not greater than 0.02. In yet another non-limiting embodiment, the abrasive article 300 may be formed to have a ratio (Cmm/Cap) of at least 0.002, such as at least 0.004 or at least 0.006 or at least 0.008 or at least 0.01 or at least 0.02 or at least 0.03 or at least 0.04 or at least 0.05 or at least 0.06 or at least 0.07 or at least 0.08 or at least 0.09 or at least 0.1 or at least 0.12 or at least 0.14 or at least 0.16 or at least 0.18 or at least 0.2 or at least 0.3 or at least 0.4 or at least 0.5 or at least 0.6 or at least 0.7 or at least 0.8 or at least 0.9. It will be appreciated that the ratio (Cmm/Cap) can be within a range including any of the minimum and maximum values noted above, including for example, at least 0.002 and not greater than 1, even at least 0.01 and not greater than 0.5 or even at least 0.025 and not greater than 0.25.

In another embodiment, the abrasive article 300 may be formed to have a particular tacking material coverage (TMc), which may be defined as the percent of the substrate surface covered with tacking material. The TMc of an abrasive article 300 may be determined by making a sample cross-section of the abrasive article 300 and taking a scanning electron microscopy or energy dispersive X-ray spectroscopy image of the cross section at a magnification of 400×. The substrate, tacking material and coating material will be shown in different colors on the images. The calculation of TMc is based on the equation TMc=(($TS_C/S_C$) *100), where $S_C$ is the circumference of the substrate as measured on the image of the cross section at a magnification of 400× using image analysis software (e.g., ImageJ image analysis software) and $TS_C$ is sum of the lengths of all portions of the circumference of the substrate that are covered by tacking material as measured on the image of the cross section at a magnification of 400× using image analysis software (e.g., ImageJ image analysis software). The TMc for an abrasive article should be calculated as the average TMc of a statistically relevant sample size of cross-section images at different locations along the length of the abrasive article 300. According to one embodiment, the abrasive article 300 may be formed to have a particular TMc of not greater than about 50%, such as, not greater than about 45%, not greater than about 40%, not greater than about 35%, not greater than about 30%, not greater than about 25%, not greater than about 20%, not greater than about 15%, not greater than about 10% or even not greater than about 5%. According to still another embodiment, the abrasive article 300 may be formed to have a particular TMc of at least about 0.01%, such as, at least about 0.1% or even at least about 1%. It will be appreciated that the TMc of an abrasive article 300 may be within a range including any of the minimum and maximum values noted above.

The bonding layer 301 can be in the form of a continuous coating and may have a particular relationship in terms of thickness relative to the average particle size of the abrasive particle 212. For example, the bonding layer 301 can have an average thickness of at least about 5% of an average particle size of the abrasive particles 212. The relative average thickness of the bonding layer 301 to the average particle size can be calculated by the absolute value of the equation (Tb/Tp)×100%, wherein Tp represents the average particle size and Tb represents the average thickness of the bonding layer 301. In other embodiments, the average thickness of the bonding layer 301 can be greater, such as at least about 8%, at least about 10%, at least about 15%, or even at least about 20%. Still, in another non-limiting embodiment, the average thickness of the bonding layer 301 can be limited, such that it is not greater than about 50%, not greater than about 40%, not greater than about 30%, or even not greater than about 20% of the average particle size of the abrasive particles 212. It will be appreciated that the bonding layer 301 can have an average thickness within a range including any of the minimum and maximum percentages noted above.

In more particular instances, the bonding layer 205 can be formed to have an average thickness that is at least 1 micron. For other abrasive articles, the bonding layer 205 can have a greater average thickness, such as at least about 2 microns, at least about 3 microns, at least about 4 microns, at least about 5 microns, at least about 7 microns, or even at least about 10 microns. Particular abrasive articles can have a bonding layer 205 having an average thickness that is not greater than about 60 microns, such as not greater than about 50 microns, such as not greater than about 40 microns, not greater than about 30 microns, or even not greater than about 20 microns. It will be appreciated that the bonding layer 205 can have an average thickness within a range between any of the minimum and maximum values noted above.

In another aspect, the abrasive article 300 can be formed to have a particular concentration of abrasive particles 212, which may facilitate improved performance of the abrasive article. According to one embodiment, the abrasive article 300 can have an abrasive particle concentration of at least 10 particles per mm of substrate, such as at least 20 particles per mm of substrate or at least 30 particles per mm of substrate or even at least 40 particles per mm of substrate. In still another non-limiting embodiment, the abrasive particle concentration can be not greater than 800 particles per mm, such as not greater than 700 particles per mm or not greater than 600 particles per mm or not greater than 500 particles per mm or not greater than 400 particles per mm or not greater than 300 particles per mm or not greater than 200 particles per mm. It will be appreciated that the abrasive particle concentration can be within a range including any of the minimum and maximum values noted above.

In still another embodiment, the abrasive article 300 can be formed to have a particular concentration of abrasive particles 212, which may facilitate improved performance of the abrasive article. According to one embodiment, the abrasive article 300 can have an abrasive particle concentration of at least 0.5 carats per kilometer of the abrasive article, such as at least 1.0 carats per kilometer, at least about 1.5 carats per kilometer of the abrasive article, at least 5 carats per kilometer, at least about 10 carats per kilometer of the abrasive article, at least 15 carats per kilometer or even at least about 20 carats per kilometer of the abrasive article. In still another non-limiting embodiment, the abrasive particle concentration can be not greater than 30 carats per kilometer, such as not greater than 25 carats per kilometer or not greater than 20 carats per kilometer or not greater than 18 carats per kilometer or not greater than 16 carats per kilometer or even not greater than 14 carats per kilometer or not greater than 12 carats per kilometer or not greater than 10 carats per kilometer or not greater than 8 carats per kilometer or even not greater than 6 carats per kilometer. It will be appreciated that the abrasive particle concentration can be within a range including any of the minimum and maximum values noted above.

Figure 12:
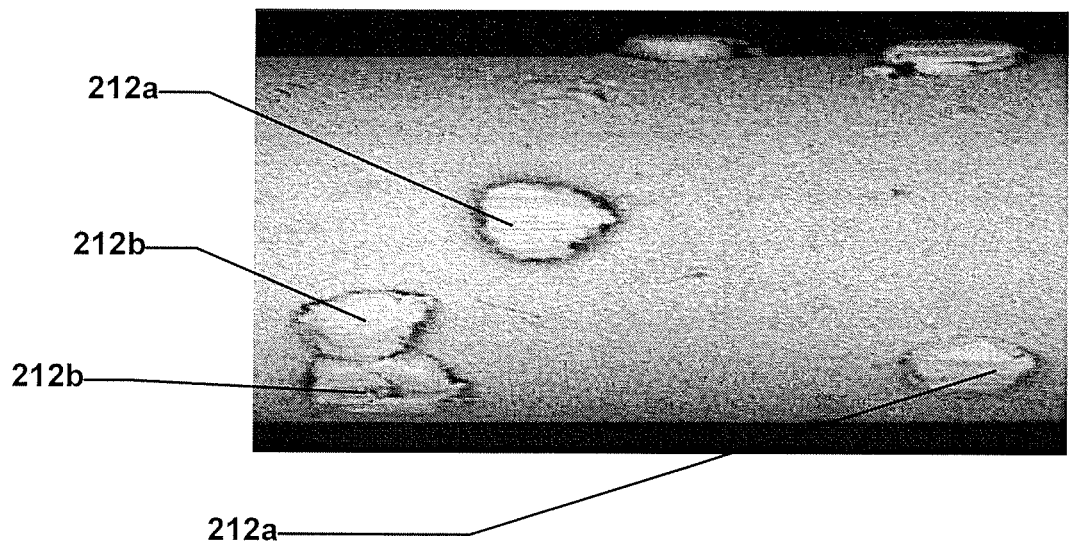
FIG. 12 includes an image of a portion of an abrasive article according to an embodiment.

In another embodiment, the abrasive article 300 may be formed to have a particular abrasive particle surface agglomeration (APsa). The APsa may be calculated by visually inspecting the surface of a portion of a substrate having at least 100 abrasive particles 212 attached thereto. The visual inspection should be conducted under a magnification of 400×. The calculation of APsa is based on the equation APsa=((TAP/TP)*100), where TP is the total number of abrasive particles on the visually inspected surface (i.e. at least 100 abrasive particles) and TAP is the total number of agglomerated particles on the visually inspected surface. An agglomerated abrasive particle is defined as any abrasive particle 212 on the visually inspected surface of a substrate where the bonding layer 205 overlying the abrasive particle 212 directly contacts the bonding layer 205 overlying at least one other abrasive particle 212. For purposes of illustration, FIG. 12 includes an image of a portion of abrasive article 300 under a magnification of 400×. As defined herein, abrasive particles 212a are examples of abrasive particles that are not agglomerated abrasive particles on the surface of abrasive article 300 and abrasive particles 212b are examples of abrasive particles that are agglomerated abrasive particles on the surface of abrasive article 300. In one embodiment, an abrasive article 300 may be formed to have a particular APsa of not greater than about 60%, such as, not greater than about 50%, not greater than about 40%, not greater than about 30%, not greater than about 20% or even not greater than about 10%. It will be appreciated that the APsa can be within a range including any of the values noted above.

Figure 4:
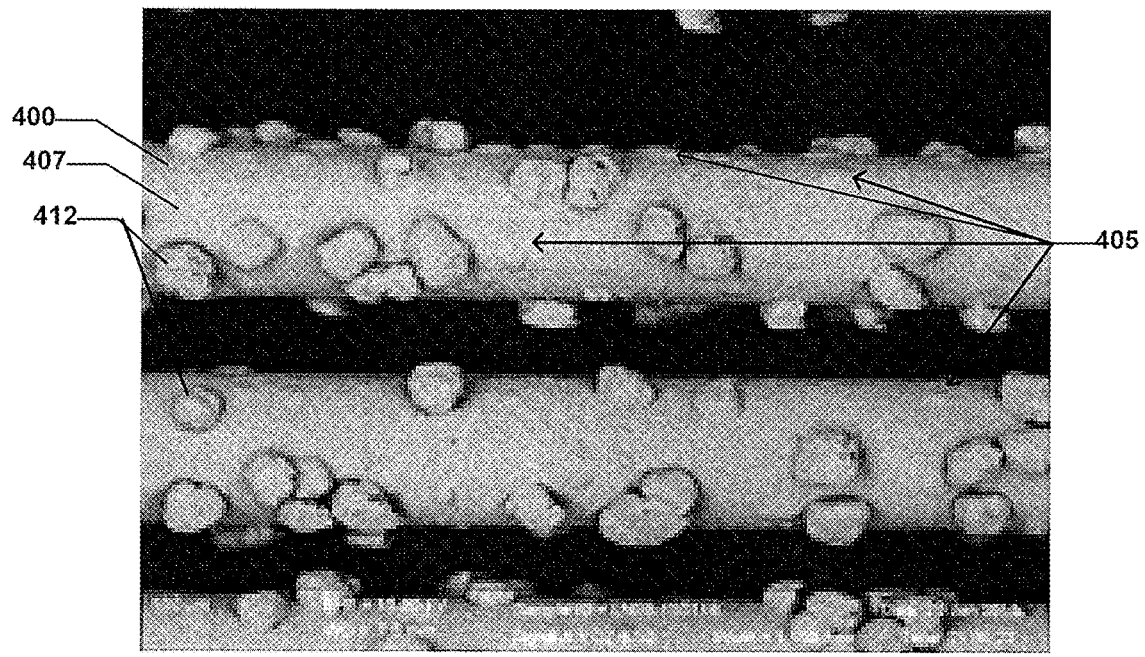
FIG. 4 includes an image of a portion of an abrasive article according to an embodiment.
Figure 5:
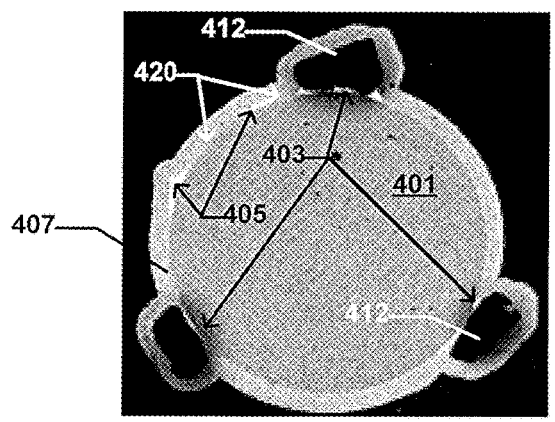
FIG. 5 includes a cross-sectional image of a portion of the abrasive article of FIG. 4.
Figure 6:
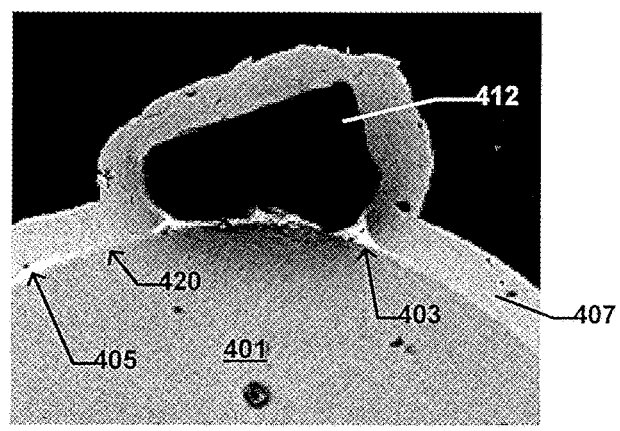
FIG. 6 includes a cross-sectional image of a portion of the abrasive article of FIG. 4.

FIG. 4 includes an image of a portion of an abrasive article according to an embodiment. FIG. 5 includes a cross-sectional image of a portion of the abrasive article of FIG. 4. FIG. 6 includes a cross-sectional image of a portion of the abrasive article of FIG. 4. As illustrated, the abrasive article 400 can include a substrate 401, abrasive particles 412 attached to the substrate 401 at discrete tacking regions 403. As further illustrated, the abrasive article 400 can include a plurality of discrete formations 405, which can be bonded directly to the surface of the substrate 401, and moreover, can be spaced apart from each other and the discrete tacking regions 403 by gap regions 420. Accordingly, the abrasive article 400 includes a discontinuous tacking layer comprising a plurality of discrete tacking regions 403 associated with and bonded to the abrasive particles 412 and further comprising discrete formations 405 which are spaced apart from the abrasive particles 412 and the discrete tacking regions 403.

As illustrated, and according to one embodiment, the discrete tacking regions 403 may have an average length as viewed in cross-section that is substantially the same as the length of the abrasive particles 412 to which they are bonded. By contrast, the discrete formations 403 may have a greater variety in shape and size, and may be larger or smaller than the discrete tacking regions 403 and the average particle size of the abrasive particles 412.

As further illustrated in FIGS. 5 and 6, the abrasive article 400 can include interfaces of direct contact between the bonding layer 407 and the substrate 401. Furthermore, at the periphery of the discrete tacking regions 403, the abrasive article 400 also includes triple-point boundaries including direct contact between the bonding layer 407, substrate 401 and tacking material of the discrete tacking regions 403. Moreover, at the periphery of the discrete formations 405, the abrasive article 400 can have a triple-point boundary including direct contact between the bonding layer 407, substrate 401 and material (e.g., tacking material) of the discrete formation 405.

The abrasive articles of the embodiments herein may be wire saws that are particularly suited for slicing of workpieces. The workpieces can be various materials, including but not limited to, ceramic, semiconductive material, insulating material, glass, natural materials (e.g., stone), organic material, and a combination thereof. More particularly, the workpieces can include oxides, carbides, nitrides, minerals, rocks, single crystalline materials, multicrystalline materials, and a combination thereof. For at least one embodiment, an abrasive article of an embodiment herein may be suitable for slicing a workpiece of sapphire, quartz, silicon carbide, and a combination thereof.

According to at least one aspect, the abrasive articles of the embodiments can be used on particular machines, and may be used at particular operating conditions that have improved and unexpected results compared to conventional articles. While not wishing to be bound to a particular theory, it is thought there may be some synergistic effect between the features of the embodiments.

Generally, cutting, slicing, bricking, squaring, or any other operation can be conducted by moving the abrasive article (i.e., wire saw) and the workpiece relative to each other. Various types and orientations of the abrasive articles relative to the workpieces may be utilized, such that a workpiece is sectioned into wafers, bricks, rectangular bars, prismatic sections, and the like.

This may be accomplished using a reel-to-reel machine, wherein moving comprises reciprocating the wire saw between a first position and a second position. In certain instances, moving the abrasive article between a first position and a second position comprises moving the abrasive article back and forth along a linear pathway. While the wire is being reciprocated, the workpiece may also be moved, including for example, rotating the workpiece.

Alternatively, an oscillating machine may be utilized with any abrasive article according to the embodiments herein. Use of an oscillating machine can include moving the abrasive article relative to the workpiece between a first position and second position. The workpiece may be moved, such as rotated, and moreover the workpiece and wire can both be moved at the same time relative each other. An oscillating machine may utilize a back and forth motion of the wire guide relative to the workpiece, wherein a reel-to-reel machine does not necessarily utilize such a motion.

For some applications, during the slicing operation the process may further include providing a coolant at an interface of the wire saw and workpiece. Some suitable coolants include water-based materials, oil-based materials, synthetic materials, and a combination thereof.

In certain instances, slicing can be conducted as a variable rate operation. The variable rate operation can include moving the wire and workpiece relative to each other for a first cycle and moving the wire and workpiece relative to each other for a second cycle. Notably, the first cycle and the second cycle may be the same or different. For example, the first cycle can include translation of the abrasive article from a first position to a second position, which in particular, may include translation of the abrasive article through a forward and reverse direction cycle. The second cycle can include translation of the abrasive article from a third position to a fourth position, which may also include translation of the abrasive article through a forward and reverse direction cycle. The first position of the first cycle can be the same as the third position of the second cycle, or alternatively, the first position and the third position may be different. The second position of the first cycle can be the same as the fourth position of the second cycle, or alternatively, the second position and the fourth position may be different.

According to a particular embodiment, the use of an abrasive article of an embodiment herein in a variable rate cycle operation can include a first cycle that includes the elapsed time to translate the abrasive article from a starting position in a first direction (e.g., forward) to a temporary position, and in a second direction (e.g., backward) from the temporary position, thus returning to the same starting position or close to the starting position. Such a cycle can include the duration for accelerating the wire from 0 m/s to set wire speed in the forward direction, the elapsed time for moving the wire at set wire speed in the forward direction, the elapsed time on decelerating the wire from set wire speed to 0 m/s in the forward direction, the elapsed time on accelerating the wire from 0 m/s to set wire speed in the backward direction, the elapsed time on moving the wire at set wire speed in the backward direction, and the elapsed time on decelerating the wire from set wire speed to 0 m/s in the backward direction.

According to one particular embodiment, the first cycle can be at least about 30 seconds, such as at least about 60 seconds, or even t least about 90 seconds. Still, in one non-limiting embodiment, the first cycle can be not greater than about 10 minutes. It will be appreciated that the first cycle can have a duration within a range between any of the minimum and maximum values above.

In yet another embodiment, the second cycle can be at least about 30 seconds, such as at least about 60 seconds, or even at least about 90 seconds. Still, in one non-limiting embodiment, the second cycle can be not greater than about 10 minutes. It will be appreciated that the second cycle can have a duration within a range between any of the minimum and maximum values above.

The total number of cycles in a for a cutting process may vary, but can be at least about 20 cycles, at least about 30 cycles, or even at least about 50 cycles. In particular instances, the number of cycles may be not greater than about 3000 cycles or even not greater than about 2000 cycles. The cutting operation may last for a duration of at least about 1 hour or even at least about 2 hours. Still, depending upon the operation, the cutting process may be longer, such as at least about 10 hours, or even 20 hours of continuous cutting.

In certain cutting operations, the wire saw of any embodiment herein may be particularly suited for operation at a particular feed rate. For example, the slicing operation can be conducted at a feed rate of at least about 0.05 mm/min, at least about 0.1 mm/min, at least about 0.5 mm/min, at least about 1 mm/min, or even at least about 2 mm/min. Still, in one non-limiting embodiment, the feed rate may be not greater than about 20 mm/min. It will be appreciated that the feed rate can be within a range between any of the minimum and maximum values above.

For at least one cutting operation, the wire saw of any embodiment herein may be particularly suited for operation at a particular wire tension. For example, the slicing operation can be conducted at a wire tension of at least about 30% of a wire break load, such as at least about 50% of the wire break load, or even at least about 60% of a break load. Still, in one non-limiting embodiment, the wire tension may be not greater than about 98% of the break load. It will be appreciated that the wire tension can be within a range between any of the minimum and maximum percentages above.

According to another cutting operation, the abrasive article can have a VWSR range that facilitates improved performance. VWSR is the variable wire speed ratio and can generally be described by the equation $t2/(t1+t3)$, wherein t2 is the elapsed time when the abrasive wire moves forward or backward at a set wire speed, wherein t1 is the elapsed time when the abrasive wire moves forward or backward from 0 wire speed to set wire speed, and t3 is the elapsed time when the abrasive wire moves forward or backward from constant wire speed to 0 wire speed. For example, the VWSR range of a wire saw according to an embodiment herein can be at least about 1, at least about 2, at least about 4, or even at least about 8. Still, in one non-limiting embodiment, the VWSR rate may be not greater than about 75 or even not greater than about 20. It will be appreciated that the VWSR rate can be within a range between any of the minimum and maximum values above. In one embodiment, an exemplary machine for variable wire speed ratio cutting operations can be a Meyer Burger DS265 DW Wire Saw machine.

Certain slicing operations may be conducted on workpieces including silicon, which can be single crystal silicon or multicrystalline silicon. According to one embodiment, use of an abrasive article according to an embodiment demonstrates a life of at least about 8 $m^2$/km, such as at least about 10 $m^2$/km, at least about 12 $m^2$/km, or even at least about 15 $m^2$/km. The wire life can be based upon the wafer area generated per kilometer of abrasive wire used, wherein wafer area generated is calculated based on one side of the wafer surface. In such instances, the abrasive article may have a particular abrasive particle concentration, such as at least about 0.5 carats per kilometer of the substrate, at least about 1.0 carats per kilometer of substrate, at least about 1.5 carats per kilometer of substrate, or even at least about 2.0 carats per kilometer of substrate. Still, the concentration may be not greater than about 20 carats per kilometer of substrate, or even not greater than about 10 carats per kilometer of substrate. The average particle size of the abrasive particles can be less than about 20 microns. It will be appreciated that the abrasive particle concentration can be within a range between any of the minimum and maximum values above. The slicing operation may be conducted at a feed rate as disclosed herein.

According to another operation, a silicon workpiece including single crystal silicon or multicrystalline silicon can be sliced with an abrasive article according to one embodiment, and the abrasive article can have a life of at least about 0.5 $m^2$/km, such as at least about 1 $m^2$/km, or even at least about 1.5 $m^2$/km. In such instances, the abrasive article may have a particular abrasive particle concentration, such as at least about 0.5 carats per kilometer of the substrate, at least about 1 carats per kilometer of substrate, of at least about 2 carats per kilometer of substrate, at least about 3 carats per kilometer of substrate. Still, the concentration may be not greater than about 30 carats per kilometer of substrate, or even not greater than about 15 carats per kilometer of substrate. The average particle size of the abrasive particles can be less than about 20 microns. It will be appreciated that the abrasive particle concentration can be within a range between any of the minimum and maximum values above.

The slicing operation may be conducted at a feed rate of at least about 0.5 mm/min, at least about 1 mm/min, at least about 2 mm/min, at least about 3 mm/min. Still, in one non-limiting embodiment, the feed rate may be not greater than about 20 mm/min. It will be appreciated that the feed rate can be within a range between any of the minimum and maximum values above.

According to another operation, a sapphire workpiece can be sliced using an abrasive article of an embodiment herein. The sapphire workpiece may include a c-plane sapphire, an a-plane sapphire, or a r-plane sapphire material. For at least one embodiment, the abrasive article can slice through the sapphire workpiece and exhibit a life of at least about 0.1 $m^2$/km, such as at least about 0.2 $m^2$/km, at least about 0.3 $m^2$/km, at least about 0.4 $m^2$/km, or even at least about 0.5 $m^2$/km. In such instances, the abrasive article may have a particular abrasive particle concentration, such as at least about 5 carats per kilometer of the substrate, at least about 10 carats per kilometer of substrate, of at least about 20 carats per kilometer of substrate, at least about 40 carats per kilometer of substrate. Still, the concentration may be not greater than about 300 carats per kilometer of substrate, or even not greater than about 150 carats per kilometer of substrate. The average particle size of the abrasive particles can be greater than about 20 microns. It will be appreciated that the abrasive particle concentration can be within a range between any of the minimum and maximum values above.

The foregoing slicing operation on the workpiece of sapphire may be conducted at a feed rate of at least about 0.05 mm/min, such as at least about 0.1 mm/min, or even at least about 0.15 mm/min. Still, in one non-limiting embodiment, the feed rate may be not greater than about 2 mm/min. It will be appreciated that the feed rate can be within a range between any of the minimum and maximum values above.

In yet another aspect, the abrasive article may be used to slice through workpieces including silicon carbide, including single crystal silicon carbide. For at least one embodiment, the abrasive article can slice through the silicon carbide workpiece and exhibit a life of at least about 0.1 $m^2$/km, such as at least about 0.2 $m^2$/km, at least about 0.3 $m^2$/km, at least about 0.4 $m^2$/km, or even at least about 0.5 $m^2$/km. In such instances, the abrasive article may have a particular abrasive particle concentration, such as at least about 1 carat per kilometer of the substrate, at least about 2 carats per kilometer of substrate, of at least about 3 carats per kilometer of substrate, at least about 4 carats per kilometer of substrate. Still, the concentration may be not greater than about 50 carats per kilometer of substrate, or even not greater than about 30 carats per kilometer of substrate. It will be appreciated that the abrasive particle concentration can be within a range between any of the minimum and maximum values above.

The foregoing slicing operation on the workpiece of silicon carbide may be conducted at a feed rate of at least about 0.05 mm/min, such as at least about 0.10 mm/min, or even at least about 0.15 mm/min. Still, in one non-limiting embodiment, the feed rate may be not greater than about 2 mm/min. It will be appreciated that the feed rate can be within a range between any of the minimum and maximum values above.

According to yet another embodiment, abrasive articles according to embodiments described herein may be produced at a certain production rate. The production rate of embodiments of abrasive articles described herein may be the speed of formation of an abrasive article, in meters of substrate per minute, wherein the abrasive article includes a substrate having an elongated body, a tacking layer overlying the substrate, abrasive particle overlying the tacking layer and defining a first abrasive particle concentration at least about 10 particles per mm of substrate, and the formation of the bonding layer. In certain embodiments, the production rate may be at least about 10 meters per minute, such as, at least about 12 meters per minute, at least about 14 meters per minute, at least about 16 meters per minute, at least about 18 meters per minute, at least about 20 meters per minute, at least about 25 meters per minute, at least about 30 meters per minute, at least about 40 meters per minute or even at least about 60 meters per minute.

In particular instances, it is noted that the present method can be used to facilitate efficient production of abrasive wire saws having a high concentration of abrasive particles. For example, the abrasive articles of the embodiments herein having any of the featured abrasive particle concentrations can be formed at any of the foregoing production rates while maintaining or exceeding performance parameters of the industry. Without wishing to be tied to a particular theory, it is theorized that utilization of a separate tacking process and bonding process can facilitate improved production rates over single step attaching and bonding processes, such as conventional electroplating processes.

Abrasive articles of the embodiments herein have demonstrated improved abrasive particle retention during use as compared to conventional abrasive wire saws without at least one of the features of the embodiments herein. For example, the abrasive articles have an abrasive particle retention of at least about 2% improvement over one or more conventional samples. In still other instances, the abrasive particle retention improvement can be at least about 4%, at least about 6%, at least about 8%, at least about 10%, at least about 12%, at least about 14%, at least about 16%, at least about 18%, at least about 20%, at least about 24%, at least about 28%, at least about 30%, at least about 34%, at least about 38%, at least about 40%, at least about 44%, at least about 48%, or even at least about 50%. Still, in one non-limiting embodiment, the abrasive particle retention improvement can be not greater than about 100%, such as not greater than about 95%, not greater than about 90%, or even not greater than about 80%.

Abrasive articles of the embodiments herein have demonstrated improved abrasive particle retention and further demonstrated improved useable life compared to conventional abrasive wire saws without at least one of the features of the embodiments herein. For example, the abrasive articles herein can have an improvement of useable life of at least about 2% compared to one or more conventional samples. In still other instances, the increase in useable life of an abrasive article of an embodiment herein compared to a conventional article can be at least about 4%, at least about 6%, at least about 8%, at least about 10%, at least about 12%, at least about 14%, at least about 16%, at least about 18%, at least about 20%, at least about 24%, at least about 28%, at least about 30%, at least about 34%, at least about 38%, at least about 40%, at least about 44%, at least about 48%, or even at least about 50%. Still, in one non-limiting embodiment, the useable life improvement can be not greater than about 100%, such as not greater than about 95%, not greater than about 90%, or even not greater than about 80%.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

An abrasive article comprising:
a substrate comprising an elongated body;
a plurality of discrete tacking regions defining a discontinuous distribution of features overlying the substrate, wherein at least one discrete tacking region of the plurality of discrete tacking regions comprises a metal material having a melting temperature not greater than 450° C.;
a plurality of discrete formations overlying the substrate and spaced apart from the plurality of discrete tacking regions; and
a bonding layer overlying the substrate, plurality of discrete tacking regions, and plurality of discrete formations.

Embodiment 2

An abrasive article comprising:
a substrate comprising an elongated body;
a plurality of discrete tacking regions comprising a metal material overlying the substrate, wherein at least one discrete tacking region is isolated from another discrete tacking region, and at least one abrasive particle is associated with at least one discrete tacking region; and
a bonding layer overlying the plurality of discrete tacking regions, the at least one abrasive particle and in direct contact with at least a portion of the substrate.

Embodiment 3

An abrasive article comprising:
a substrate comprising an elongated body;
a plurality of discrete tacking regions overlying the substrate and defining gap regions between each of the discrete tacking regions of the plurality of discrete tacking regions;
abrasive particles overlying the plurality of discrete tacking regions; and
a plurality of discrete formations overlying the substrate and spaced apart from the plurality of discrete tacking regions and the abrasive particles.

Embodiment 4

The abrasive article of any one of embodiments 2 and 3, wherein the plurality of discrete tacking regions include a metal material having melting temperature not greater than 450° C.

Embodiment 5

The abrasive article of any one of embodiments 1 and 4, wherein the plurality of discrete tacking regions include a metal material having melting temperature of at least 100° C.

Embodiment 6

The abrasive article of any one of embodiments 1, 2, and 3, wherein at least one of the discrete tacking regions of the plurality of discrete tacking regions comprises a metal material comprising an alloy of transition metal elements, wherein at least one of the discrete tacking regions further comprises a metal selected from the group of metals consisting of lead, silver, copper, zinc, titanium, molybdenum, chromium, iron, manganese, cobalt, niobium, tantalum, tungsten, palladium, platinum, gold, ruthenium, and a combination thereof, wherein at least one of the discrete tacking regions comprises a metal alloy of tin, wherein at least one of the discrete tacking regions comprises a solder material.

Embodiment 7

The abrasive article of embodiment 6, wherein the solder material comprises tin.

Embodiment 8

The abrasive article of embodiment 6, wherein the solder material consists essentially of tin.

Embodiment 9

The abrasive article of embodiment 2, further comprising a plurality of discrete formations overlying the substrate and spaced apart from the plurality of discrete tacking regions.

Embodiment 10

The abrasive article of any one of embodiments 1, 3, and 9, wherein at least one of the discrete formations of the plurality of discrete formations comprises a metal material.

Embodiment 11

The abrasive article of any one of embodiments 1, 3, and 9, wherein at least one of the discrete formations of the plurality of discrete formations includes a metal material having melting temperature of at least 100° C. and not greater than 450° C.

Embodiment 12

The abrasive article of any one of embodiments 1, 3, and 9, wherein at least one of the discrete formations of the plurality of discrete formations comprises a solder material.

Embodiment 13

The abrasive article of any one of embodiments 1, 3, and 9, wherein at least one of the discrete formations of the plurality of discrete formations comprises tin.

Embodiment 14

The abrasive article of any one of embodiments 1, 3, and 9, wherein each of the discrete formations of the plurality of discrete formations comprises a solder material.

Embodiment 15

The abrasive article of any one of embodiments 1, 3, and 9, wherein at least one of the discrete formations of the plurality of discrete formations comprises substantially the same material as a material of the plurality of discrete tacking regions.

Embodiment 16

The abrasive article of any one of embodiments 1, 3, and 9, wherein each of the discrete formations is directly bonded to the substrate.

Embodiment 17

The abrasive article of any one of embodiments 1, 3, and 9, wherein the plurality of discrete formations are randomly distributed on the surface of the substrate.

Embodiment 18

The abrasive article of any one of embodiments 1, 3, and 9, further comprising gap regions extending between and separating the plurality of discrete formations from each other and further separating the plurality of discrete formations from the plurality of discrete tacking regions.

Embodiment 19

The abrasive article of any one of embodiments 1, 3, and 9, wherein the plurality of discrete formations have a generally rounded shape.

Embodiment 20

The abrasive article of any one of embodiments 1, 2, and 3, wherein the substrate is essentially free of a barrier layer.

Embodiment 21

The abrasive article of any one of embodiments 1, 2, and 3, wherein the substrate is an uncoated wire.

Embodiment 22

The abrasive article of any one of embodiments 1, 2, and 3, wherein the substrate comprises a metal wire essentially free of any barrier layers on an exterior surface.

Embodiment 23

The abrasive article of any one of embodiments 1, 2, and 3, wherein the substrate comprises a metal wire having at least one barrier layer overlying an exterior surface, wherein the barrier layer comprises a metal selected from the group of copper, brass, nickel or a combination thereof.

Embodiment 24

The abrasive article of any one of embodiments 1, 2, and 3, wherein the plurality of discrete tacking regions are randomly distributed on the surface of the substrate.

Embodiment 25

The abrasive article of any one of embodiments 1 and 2, further comprising abrasive particles overlying the plurality of discrete tacking regions.

Embodiment 26

The abrasive article of any one of embodiments 3 and 25, wherein the abrasive particles comprise a material selected from the group of oxides, carbides, nitrides, borides, oxynitrides, oxyborides, diamond, and a combination thereof.

Embodiment 27

The abrasive article of any one of embodiments 3 and 25, wherein the abrasive particles comprise a superabrasive material.

Embodiment 28

The abrasive article of any one of embodiments 3 and 25, wherein the abrasive particles comprise diamond.

Embodiment 29

The abrasive article of any one of embodiments 3 and 25, wherein the abrasive particles comprise a material having a Vickers hardness of at least about 10 GPa.

Embodiment 30

The abrasive article of embodiment 3, further comprising a bonding layer overlying the plurality of discrete tacking regions.

Embodiment 31

The abrasive article of any one of embodiments 1, 2, and 30, wherein at least a portion of the bonding layer is directly bonded to the substrate.

Embodiment 32

The abrasive article of any one of embodiments 1, 2, and 30, wherein at least a portion of the bonding layer is directly bonded to the substrate in gap regions between the plurality of discrete tacking regions and plurality of discrete formations.

Embodiment 33

The abrasive article of any one of embodiments 1, 2, and 30, wherein at least a portion of the bonding layer is directly bonded to the plurality of discrete tacking regions and plurality of discrete formations.

Embodiment 34

The abrasive article of any one of embodiments 1, 2, and 30, wherein the bonding layer comprises a material selected from the group of materials consisting of metals, metal alloys, cermets, ceramics, composites, and a combination thereof, wherein the bonding layer comprises a transition metal element, wherein the bonding layer comprises an alloy of transition metal elements, wherein the bonding layer comprises a metal selected from the group of metals consisting of lead, silver, copper, zinc, tin, titanium, molybdenum, chromium, iron, manganese, cobalt, niobium, tantalum, tungsten, palladium, platinum, gold, ruthenium, and a combination thereof, wherein the bonding layer comprises nickel, wherein the bonding layer consists essentially of nickel.

Embodiment 35

The abrasive article of any one of embodiments 1, 2, and 3, further comprising a content of metal material (Cmm) in the plurality of discrete tacking regions and plurality of discrete formations, measured as grams of the metal material per kilometer of the length of the substrate, wherein the content of metal material (Cmm) is not greater than 2 g/km or not greater than 1 g/km or not greater than 0.8 g/km or not greater than 0.6 g/km or not greater than 0.4 g/km or not greater than 0.2 g/km or not greater than 0.1 g/km or not greater than 0.08 g/km or not greater than 0.06 g/km or not greater than 0.04 g/km or not greater than 0.02 g/km or not greater than 0.01 g/km.

Embodiment 36

The abrasive article of any one of embodiments 1, 2, and 3, further comprising a content of metal material (Cmm) in the plurality of discrete tacking regions and plurality of discrete formations, measured as grams of the metal material per kilometer of the length of the substrate, wherein the content of metal material (Cmm) is at least 0.001 g/km or at least 0.002 g/km or at least 0.004 g/km or at least 0.006 g/km or at least 0.008 g/km or at least 0.01 g/km or at least 0.02 g/km or at least 0.04 g/km or at least 0.06 g/km or at least 0.08 g/km or at least 0.01 g/km.

Embodiment 37

The abrasive article of any one of embodiments 1, 2, and 3, further comprising a content of abrasive particles (Cap) as measured in grams per kilometer of length of the substrate and a content of metal material (Cmm) in the plurality of discrete tacking regions and plurality of discrete formations as measured in grams per kilometer of length of the substrate, and further comprising a ratio (Cmm/Cap) of not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.18 or not greater than 0.16 or not greater than 0.15 or not greater than 0.014 or not greater than 0.13 or no greater than 0.12 or not greater than 0.11 or not greater than 0.1 or not greater than 0.09 or not greater than 0.08 or not greater than 0.07 or not greater than 0.06 or no greater than 0.05 or not greater than 0.04 or not greater than 0.03 or not greater than 0.02.

Embodiment 38

The abrasive article of any one of embodiments 1, 2, and 3, further comprising a content of abrasive particles (Cap) as measured in grams per kilometer of length of the substrate and a content of metal material (Cmm) in the plurality of discrete tacking regions and plurality of discrete formations as measured in grams per kilometer of length of the substrate, and further comprising a ratio (Cmm/Cap) of at least 0.002 or at least 0.004 or at least 0.006 or at least 0.008 or at least 0.01 or at least 0.02 or at least 0.03 or at least 0.04 or at least 0.05 or at least 0.06 or at least 0.07 or at least 0.08 or at least 0.09 or at least 0.1 or at least 0.12 or at least 0.14 or at least 0.16 or at least 0.18 or at least 0.2 or at least 0.3 or at least 0.4 or at least 0.5 or at least 0.6 or at least 0.7 or at least 0.8 or at least 0.9.

Embodiment 39

The abrasive article of any one of embodiments 1, 2, and 3, further comprising an abrasive particle concentration of at least 10 particles per mm of substrate, at least 20 particles per mm of substrate, at least 30 particles per mm of substrate, and not greater than 800 particles per mm of substrate.

Embodiment 40

The abrasive article of any one of embodiments 1, 2, and 3, further comprising an abrasive particle concentration of at least about 0.5 carats per kilometer of the substrate, at least about 1.0 carats per kilometer of substrate, of at least about 1.5 carats per kilometer of substrate, not greater than about 30.0 carats per kilometer of substrate.

Embodiment 41

A method of forming an abrasive article comprising:
translating a substrate having an elongated body through a mixture including abrasive particles and a particulate including a tacking material;
attaching at least a portion of the abrasive particles and particulate to the substrate; and
treating the substrate to form an abrasive article preform including:
a plurality of discrete tacking regions overlying the substrate and defining gap regions between each of the discrete tacking regions of the plurality of discrete tacking regions;
abrasive particles overlying the plurality of discrete tacking regions; and
a plurality of discrete formations overlying the substrate and spaced apart from the plurality of discrete tacking regions and the abrasive particles.

Embodiment 42

The method of embodiment 41, wherein the mixture includes at least 5 wt % and not greater than 80 wt % of the abrasive particles for the total weight of the mixture.

Embodiment 43

The method of embodiment 41, wherein the mixture includes at least 0.2 wt % to not greater than 20 wt % of the particulate including the tacking material for the total weight of the mixture.

Embodiment 44

The method of embodiment 41, wherein the abrasive particles have an average particle size (PSa) within a range including at least 2 microns and not greater than 80 microns.

Embodiment 45

The method of embodiment 41, wherein the particulate comprises an average particles size (PSp) within a range including at least 0.01 microns and not greater than 25 microns.

Embodiment 46

The method of embodiment 41, wherein the abrasive particles have an average particle size (PSa) and the particulate comprises an average particles size (PSp), and wherein the mixture includes a ratio (PSp/PSa) of not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.18 or not greater than 0.16 or not greater than 0.15 or not greater than 0.014 or not greater than 0.13 or no greater than 0.12 or not greater than 0.11 or not greater than 0.1 or not greater than 0.09 or not greater than 0.08 or not greater than 0.07 or not greater than 0.06 or no greater than 0.05 or not greater than 0.04 or not greater than 0.03 or not greater than 0.02.

Embodiment 47

The method of embodiment 41, wherein the abrasive particles have an average particle size (PSa) and the particulate comprises an average particles size (PSp), and wherein the mixture includes a ratio (PSp/PSa) of at least 0.01 or at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14 or at least 0.15 or at least 0.16 or at least 0.17 or at least 0.18 or at least 0.19 or at least 0.2 or at least 0.3 or at least 0.4 or at least 0.5 or at least 0.6 or at least 0.7 or at least 0.8 or at least 0.9.

Embodiment 48

The method of embodiment 41, wherein treating includes heating the preform to a temperature within a range including at least 100° C. and not greater than 450° C.

Embodiment 49

The method of embodiment 41, wherein the mixture includes flux.

Embodiment 50

The method of embodiment 41, wherein the mixture is a slurry comprising a carrier for the abrasive particles and particulate, the carrier including water.

Embodiment 51

The method of embodiment 41, further comprising forming a bonding layer overlying the substrate and abrasive particles, wherein the bonding layer is formed by a deposition process, wherein the deposition process is selected from the group consisting of plating, electroplating, dipping, spraying, printing, coating, and a combination thereof.

Embodiment 52

The method of embodiment 41, wherein the process of attaching includes attaching the abrasive particles and particulate from a mixture at a temperature within a range including at least 1° C. and not greater than 300° C.

Embodiment 53

The abrasive article of any one of embodiments 1, 2, and 3, further comprising a ratio (PSp/PSa) of at least about 0.025 and not greater than about 0.25.

Embodiment 54

The abrasive article of any one of embodiments 1, 2, and 3, further comprising a ratio (Cp/Cap) of at least about 0.025 and not greater than about 0.25.

Embodiment 55

The abrasive article of any one of embodiments 1, 2, and 3, further comprising a ratio (Cmm/Cap) of at least 0.002 and not greater than 1, at least 0.01 and not greater than 0.5 and at least 0.025 and not greater than 0.25.

Embodiment 56

The abrasive article of any one of embodiments 1, 2, and 3, further comprising a TMc of not greater than about 50%, not greater than about 45%, not greater than about 40%, not greater than about 35%, not greater than about 30%, not greater than about 25%, not greater than about 20%, not greater than about 15%, not greater than about 10% and not greater than about 5%.

Embodiment 57

The abrasive article of any one of embodiments 1, 2, and 3, further comprising a TMc of at least about 0.01%, at least about 0.1% and at least about 1.%.

Embodiment 58

The abrasive article of any one of embodiments 1, 2, and 3, further comprising an APsa of not greater than about 60%, such as, not greater than about 50%, not greater than about 40%, not greater than about 30%, not greater than about 20% or even not greater than about 10%.

Example 1

A length of high strength carbon steel wire is obtained as a substrate. The high strength carbon steel wire has a brass coating layer and an average diameter of approximately 175 microns. The wire is translated through a mixture including about 40 wt % diamond commercially available as 20% Ni coated micron diamond from ABC Warren Superabrasives having an average particle size of about 35 micrometers, and about 2 wt % of tin particulate material commercially available as SN-101 tin powder from Atlantic Equipment Engineers having an average particle size of 1-5 micrometers, and about 10 wt % of additives including ZnCl flux. The mixture also included an additive in the form of a viscosity modifier, which was present in an amount sufficient to make the mixture with a viscosity of 3-5 centipoise at room temperature. The wire is translated at a rate of approximately 20 to 30 m/min.

The diamond, particulate, and flux are attached to the wire as it was drawn vertically from the mixture and the structure is heated at a temperature within a range of 220 to 280 degree Celsius for a duration of 0.2 to 0.5 seconds to form an abrasive article preform.

Thereafter, the abrasive article preform is washed using 10% sulfamic acid followed by a rinse with de-ionized water. The rinsed article is electroplated with nickel to form a bonding layer directly contacting and overlying the abrasive particles and portions of the substrate. FIGS. 4-6 include images of the abrasive article formed from the process of Example 1.

Example 2

Figure 7A:
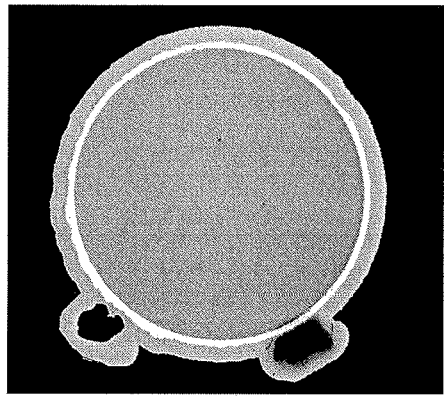
FIG. 7A includes a cross-sectional image of a portion of a comparative abrasive article.

A sample abrasive wire S1 was formed according to embodiments described herein. For sample abrasive wire S1, a length of high strength carbon steel wire was obtained as a substrate. Diamond grains having an average particle size of between 30 microns to 50 microns were attached to the wire according to embodiments described herein using discrete Sn tacking regions (i.e., a discontinuous distribution of tacking material on the surface of the wire). The diamond grains, discrete Sn tacking regions and exposed wire surface were cleaned and coated with a Ni bonding layer having a thickness of 10 microns. FIG. 7A includes a cross-sectional image of the sample abrasive wire S1.

Figure 7B:
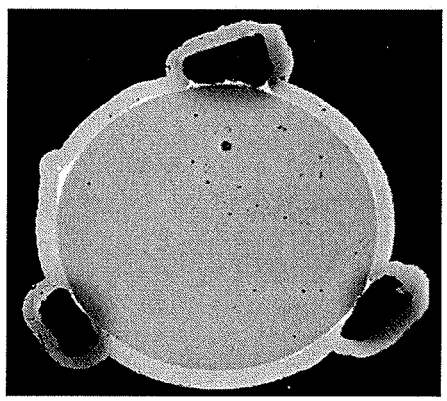
FIG. 7B includes a cross-sectional image of a portion of an abrasive article according to an embodiment.

For purposes of comparison, a comparative sample abrasive wire CS1 was formed. For comparative sample abrasive wire CS1, a length of high strength carbon steel wire was obtained as a substrate. Diamond grains having an average particle size of between 30 microns to 50 microns were attached to the wire using a continuous layer of Sn tacking material. The diamond grains and Sn tacking layer were cleaned and coated with Ni bonding layer having a thickness of 10 microns. FIG. 7B includes a cross sectional image of the sample abrasive wire S1.

Figure 8:
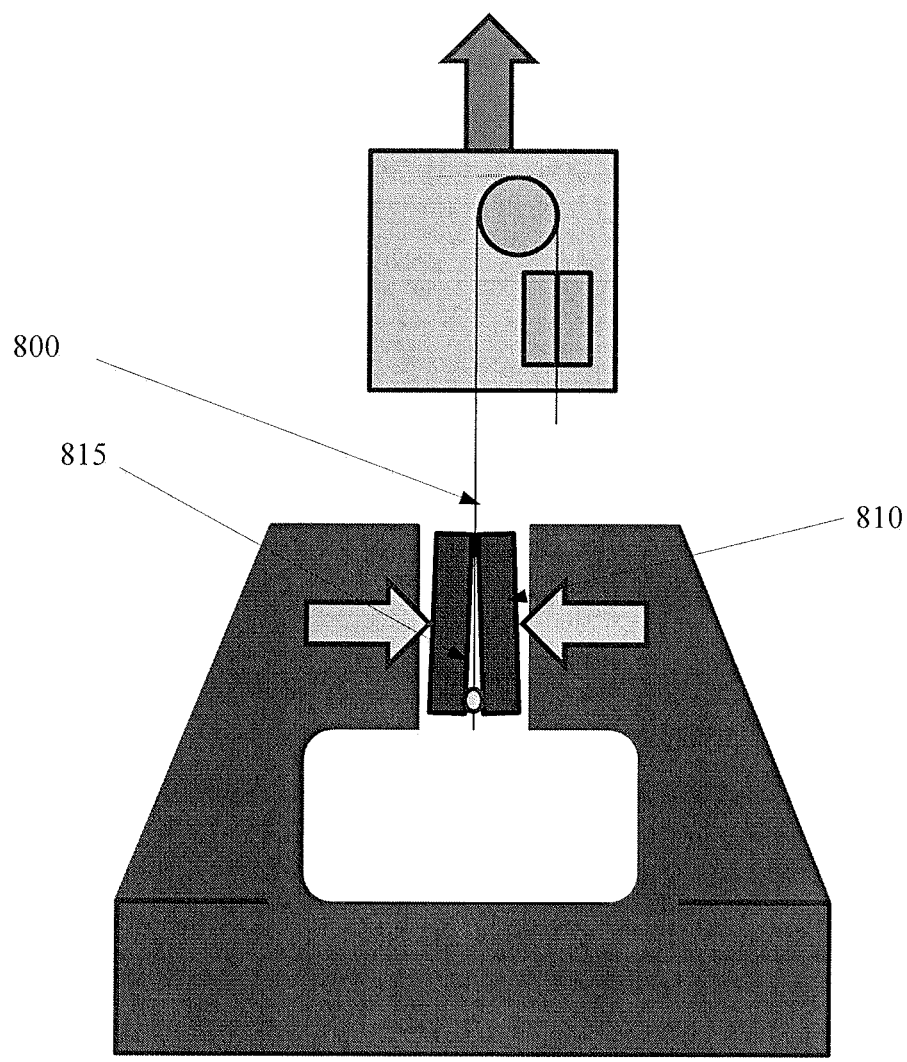
FIG. 8 includes an illustration of the experimental setup for a coating adhesion test.

A coating adhesion test was performed according to the experimental setup shown in FIG. 8. As shown in FIG. 8, a sample abrasive wire 800 (e.g., sample abrasive wire S1 or CS1) is pulled through two clamps 810 having jaw faces 815. The jaw faces 815 are angled so that their upper edges contact the sample abrasive wire 800. The clamping pressure is then systematically increased using a pneumatic controller as the sample abrasive wire 800 is pulled through the two clamps 810 in order to evaluate the adhesion strength of the Ni bonding on the sample abrasive wire 800.

Figure 9A:
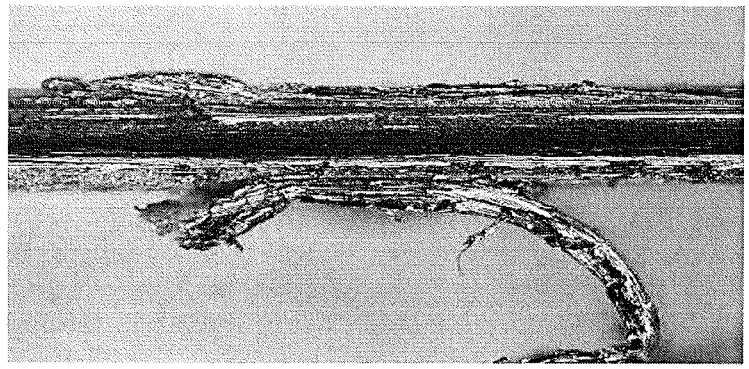
FIG. 9A includes an image of a portion of a comparative abrasive article.

For comparative sample abrasive wire CS1, the Ni bonding was removed from the surface of the abrasive wire at a clamping pressure of 20 psi. FIG. 9A includes an image of the comparative sample abrasive wire CS1 after the adhesion test showing the Ni bonding removed from the surface of the wire.

Figure 9B:
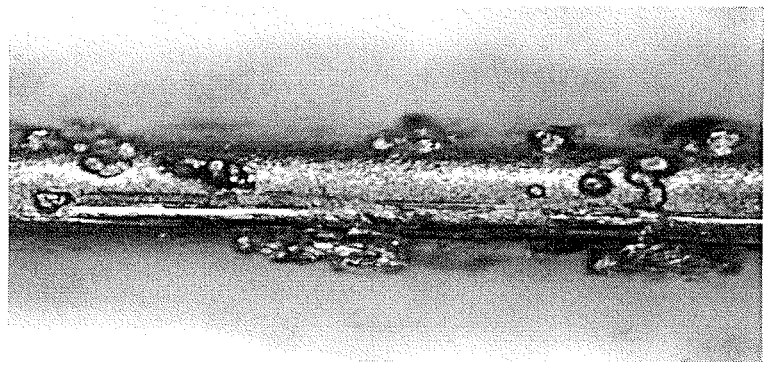
FIG. 9B includes an image of a portion of an abrasive article according to an embodiment.

The Ni bonding of sample abrasive wire S1 remained adhered to the surface of the wire at a clamping pressure of 20 psi. FIG. 9B includes an image of the sample abrasive wire S1 after the adhesion test, showing an intact Ni bonding layer with only small scratches on the coating surface. As shown through the comparison of FIGS. 9A and 9B, the Ni bonding on abrasive wire sample S1 had better adhesion to the substrate than Ni bonding on the comparative abrasive wire sample CS1.

Example 3

A sample abrasive wire S2 was formed according to embodiments described herein. For sample abrasive wire S2, a length of high strength carbon steel wire is obtained as a substrate. Diamond grains having an average particle size of between 8 microns to 12 microns were attached to the wire according to embodiments described herein using discrete Sn tacking regions (i.e., a discontinuous distribution of tacking material on the surface of the wire). The diamond grains, discrete Sn tacking regions and exposed wire surface were cleaned and coated with nickel bonding layer having a thickness of 4 microns.

For purposes of comparison, a comparative sample abrasive wire CS2 was formed. For comparative sample abrasive wire CS2, a length of high strength carbon steel wire is obtained as a substrate. Diamond grains having an average particle size of between 8 microns to 12 microns were attached to the wire using a continuous layer Sn tacking material. The diamond grains and Sn tacking layer were cleaned and coated with Ni bonding layer having a thickness of 4 microns.

A silicon cutting test was performed on a Meyer Burger DS 271 wire saw. Testing conditions are listed in Table 1 below:

TABLE 1

| Cutting Test Performance Parameters | |
|---|---|
| Work Material | mono crystalline silicon with the dimension of 125 × 125 mm pseudo square |
| Wire Tension | 22 N |
| Maximum Wire Speed | 18 m/s |
| Feed Rate | 0.75 mm/min |
| Coolant | 22 N |

Figure 10:
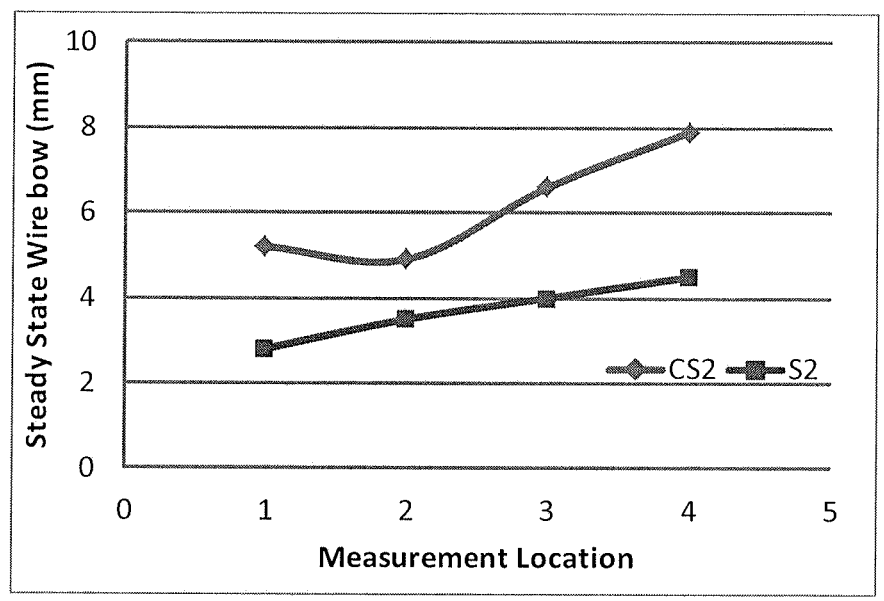
FIG. 10 includes a plot the steady state wire bow for a sample abrasive wire formed according to an embodiment and a comparative abrasive article.

Wire bow performance for sample abrasive wire S2 and comparative sample abrasive wire CS2 was measured at 4 different locations across the 200 mm silicon ingot. FIG. 10 includes a plot of the steady state wire bow for sample abrasive wire S2 and comparative sample abrasive wire CS2 at the 4 measurement locations. Generally, smaller steady state wire bow is preferred in wire saw performance as it suggests more effective cutting on the work material. As shown in FIG. 10, sample abrasive wire S2 produced smaller steady state wire bow than comparative sample abrasive wire CS2 at all four measurement locations across the workpiece.

Example 4

Three sample abrasive wires S3, S4 and S5 were formed using a dip coating process.

Sample abrasive wire S3 was formed using a brass coated steel wire having a thickness of approximately 100 microns. The wire was pretreated with a 6% hydrochloride solution to remove excess oxide on the surface of the wire. The core wire was then dip coated through a slurry mixture of 5 grams of 2-5 micron Sn powder, 100 grams of 8-16 micron diamond grains, hydrochloride, zinc chloride, glycerine and water. The coated wire was then heated to attach the diamond grains to the wire and washed with a hot acid and water bath. The coated wire was then electroplated with a nickel bonding layer having a thickness of 4 microns.

Due to insufficient tacking material in the slurry, minimal diamond grains were successfully tacked to the sample abrasive wire S3, which ultimately made the wire unusable.

Sample abrasive wire S4 was formed using a brass coated steel wire having a thickness of approximately 100 microns. The wire was pretreated with a 6% hydrochloride solution to remove excess oxide on the surface of the wire. The core wire was then dip coated through a slurry mixture of 40 grams of 2-5 micron Sn powder, 100 grams of 8-16 micron diamond grains, hydrochloride, zinc chloride, glycerine and water. The coated wire was then heated to attach the diamond grains to the wire and washed with a hot acid and water bath. The coated wire was then electroplated with a nickel bonding layer having a thickness of 4 microns.

Figure 11A:
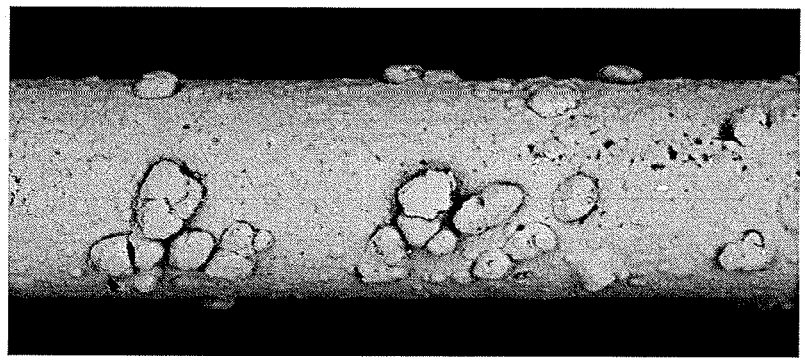
FIG. 11A includes an image of a portion of a comparative abrasive article.

A visual inspection of sample abrasive wire S4 showed that diamond grains were successfully attached to the wire and coated with electroplated nickel. FIG. 11A includes a surface SEM image of sample abrasive wire S4. As shown in FIG. 11A, agglomerations of diamond grains were observed. Without wishing to be tied to any particular theory, it is believed that agglomeration of the diamond grains occurred due to non-optimal Sn powder particle size and non-optimal Sn powder concentration in the slurry.

Sample abrasive wire S5 was formed using a brass coated steel wire having a thickness of approximately 100 microns. The wire was pretreated with a 6% hydrochloride solution to remove excess oxide on the surface of the wire. The core wire was then dip coated through a slurry mixture of 10 grams of 1-2 micron Sn powder, 100 grams of 8-16 micron diamond grains, hydrochloride, zinc chloride, glycerine and water. The coated wire was then heated to attach the diamond grains to the wire and washed with a hot acid and water bath. The coated wire was then electroplated with a nickel bonding layer having a thickness of 4 microns.

Figure 11B:
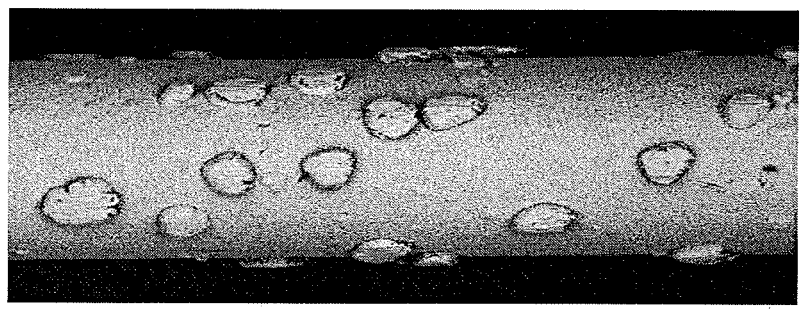
FIG. 11B includes an image of a portion of an abrasive article according to an embodiment.

A visual inspection of sample abrasive wire S5 showed that diamond grains were successfully attached to the wire and coated with electroplated nickel. FIG. 11B includes a surface SEM image of sample abrasive wire S4. As shown in FIG. 11B, diamond grains were distributed uniformly on the surface of the wire with little agglomeration.

For purposes of comparison, the ratio PSp/PSa, the ratio Cp/Cap, the ratio Cmm/Cap, the TMc and the APsa were measured and calculated according to procedures described herein for sample abrasive wires S4 and S5. The results of these measurements for sample abrasive wires S4 and S5 are summarized in Table 2 below:

TABLE 2

Sample Measurements

| Measurement/Ratio | S4 | S5 |
| --- | --- | --- |
| PSp/PSa | 0.29 | 0.125 |
| Cp/Cap | 0.4 | 0.1 |
| Cmm/Cap | 0.4 | 0.1 |
| TMc | 70% | 10% |
| APsa | 60% | 10% |

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a substrate comprising an elongated body;
   a plurality of discrete tacking regions overlying the substrate and defining gap regions between each of the discrete tacking regions of the plurality of discrete tacking regions;
   abrasive particles overlying the plurality of discrete tacking regions; and
   a plurality of discrete formations overlying the substrate and spaced apart from the plurality of discrete tacking regions and the abrasive particles, wherein the discrete formations are essentially free of abrasive particles, and wherein the plurality of discrete formations are randomly distributed on the surface of the substrate.

2. The abrasive article of claim 1, wherein at least one of the discrete tacking regions further comprises a metal selected from the group of metals consisting of lead, silver, copper, zinc, titanium, molybdenum, chromium, iron, manganese, cobalt, niobium, tantalum, tungsten, palladium, platinum, gold, ruthenium, and a combination thereof.

3. The abrasive article of claim 1, wherein each of the discrete formations is directly bonded to the substrate.

4. The abrasive article of claim 1, further comprising gap regions extending between and separating the plurality of discrete formations from each other and further separating the plurality of discrete formations from the plurality of discrete tacking regions.

5. The abrasive article of claim 1, wherein the plurality of discrete formations have a generally rounded shape.

6. The abrasive article of claim 1, wherein the substrate is essentially free of a barrier layer.

7. The abrasive article of claim 1, wherein the substrate is an uncoated wire.

8. The abrasive article of claim 1, wherein the substrate comprises a metal wire essentially free of any barrier layers on an exterior surface.

9. The abrasive article of claim 1, wherein the substrate comprises a metal wire having at least one barrier layer overlying an exterior surface, wherein the barrier layer comprises a metal selected from the group of copper, brass, nickel or a combination thereof.

10. The abrasive article of claim 1, wherein the plurality of discrete tacking regions are randomly distributed on the surface of the substrate.

11. The abrasive article of claim 1, wherein the abrasive particles comprise a material selected from the group of oxides, carbides, nitrides, borides, oxynitrides, oxyborides, diamond, and a combination thereof.

12. The abrasive article of claim 1, wherein the abrasive particles comprise a superabrasive material.

13. The abrasive article of claim 1, wherein the abrasive particles comprise diamond.

14. The abrasive article of claim 1, wherein the abrasive particles comprise a material having a Vickers hardness of at least about 10 GPa.

15. The abrasive article of claim 1, further comprising a bonding layer overlying the plurality of discrete tacking regions.

16. The abrasive article of claim 15, wherein at least a portion of the bonding layer is directly bonded to the substrate.

17. The abrasive article of claim 15, wherein at least a portion of the bonding layer is directly bonded to the substrate in gap regions between the plurality of discrete tacking regions and plurality of discrete formations.

18. An abrasive article comprising:
a substrate comprising an elongated body, wherein the substrate is an uncoated wire;
a plurality of discrete tacking regions overlying the substrate and defining gap regions between each of the discrete tacking regions of the plurality of discrete tacking regions;
abrasive particles overlying the plurality of discrete tacking regions; and
a plurality of discrete formations overlying the substrate and spaced apart from the plurality of discrete tacking regions and the abrasive particles, wherein the discrete formations are essentially free of abrasive particles.

19. An abrasive article comprising:
a substrate comprising an elongated body;
a plurality of discrete tacking regions overlying the substrate and defining gap regions between each of the discrete tacking regions of the plurality of discrete tacking regions;
abrasive particles overlying the plurality of discrete tacking regions; and
a plurality of discrete formations overlying the substrate and spaced apart from the plurality of discrete tacking regions and the abrasive particles, wherein the discrete formations are essentially free of abrasive particles, and wherein the plurality of discrete formations have a generally rounded shape.

* * * * *

UNITED STATES PATENT AND TRADEMARK OFFICE
CERTIFICATE OF CORRECTION

PATENT NO. : 10,583,506 B2
APPLICATION NO. : 16/158457
DATED : March 10, 2020
INVENTOR(S) : Yinggang Tian et al.

It is certified that error appears in the above-identified patent and that said Letters Patent is hereby corrected as shown below:

On the Title Page

In Column 2, Item (56), U.S. Patent Documents, Line 1, please delete "Comstock, III et al." and insert --G.E. Comstock 3D., ET AL.--

Signed and Sealed this
Twenty-fourth Day of May, 2022

Katherine Kelly Vidal
*Director of the United States Patent and Trademark Office*